(12) United States Patent
Ukai et al.

(10) Patent No.: US 9,124,100 B2
(45) Date of Patent: Sep. 1, 2015

(54) POWER SUPPLY SYSTEM, CONTROL DEVICE OF POWER SUPPLY SYSTEM, OPERATION METHOD OF POWER SUPPLY SYSTEM, AND CONTROL METHOD OF POWER SUPPLY SYSTEM

(75) Inventors: Kunihiro Ukai, Nara (JP); Hiroaki Kaneko, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 756 days.

(21) Appl. No.: 13/514,470

(22) PCT Filed: Aug. 3, 2011

(86) PCT No.: PCT/JP2011/004393
§ 371 (c)(1),
(2), (4) Date: Jun. 7, 2012

(87) PCT Pub. No.: WO2012/017649
PCT Pub. Date: Feb. 9, 2012

(65) Prior Publication Data
US 2012/0242150 A1    Sep. 27, 2012

(30) Foreign Application Priority Data
Aug. 4, 2010 (JP) .................. 2010-175549

(51) Int. Cl.
*H02J 1/00* (2006.01)
*H02J 3/00* (2006.01)
*H02J 3/32* (2006.01)
(Continued)

(52) U.S. Cl.
CPC ... *H02J 1/00* (2013.01); *H02J 3/32* (2013.01); *H02J 3/381* (2013.01);
(Continued)

(58) Field of Classification Search
CPC ...... H02J 1/00; H02J 2001/004; Y02E 60/50; Y10T 307/615; Y10T 307/50; Y10T 307/696; Y10T 307/729
USPC ........................................ 307/64, 80, 86, 126
See application file for complete search history.

(56) References Cited

U.S. PATENT DOCUMENTS

2004/0217652 A1    11/2004    Bitoh
2005/0062289 A1    3/2005    Cho et al.
(Continued)

FOREIGN PATENT DOCUMENTS

JP    2008-146116    6/2008
JP    2009-240054    10/2009

OTHER PUBLICATIONS
International Search Report issued in International Patent Application No. PCT/JP2011/004393 dated Nov. 8, 2011.
Chinese Office Action issued in Chinese Application No. 201180004988.3 dated Oct. 20, 2014, w/English translation.

*Primary Examiner* — Carlos Amaya
(74) *Attorney, Agent, or Firm* — McDermott Will & Emery LLP

(57) ABSTRACT

A power supply system according to the present invention includes a control device (110) which is configured such that if it is predicted that the sum of start-up power for a power generation system (101) and electric power consumed by an external electrical load (105) at start-up of the power generation system (101) and/or the sum of stopped-period power for the power generation system (101) and electric power consumed by the external electrical load (105) at stopping of power generation of the power generation system (101) exceed upper limit power, up to which an electric rate is kept to a relatively low unit price, and that the electric rate is to be changed to a relatively high unit price, then the control device (110) performs control of supplying electric power stored in an electrical storage unit (107) to at least one of the power generation system (101) and the external electrical load (105) in order to prevent the amount of electric power supplied from a power grid (104) from exceeding the upper limit power.

22 Claims, 14 Drawing Sheets

(51) Int. Cl.
*H02J 3/38* (2006.01)
*H02J 3/14* (2006.01)

(52) U.S. Cl.
CPC ..... *H02J 2001/004* (2013.01); *H02J 2003/146* (2013.01); *Y02E 60/50* (2013.01); *Y10T 307/50* (2015.04); *Y10T 307/615* (2015.04); *Y10T 307/696* (2015.04); *Y10T 307/729* (2015.04)

(56) References Cited

U.S. PATENT DOCUMENTS

2006/0078773 A1* 4/2006 Speranza et al. ........... 429/23
2009/0026841 A1   1/2009 Nakanishi

* cited by examiner

| ELECTRIC POWER USAGE | 0 TO P1 kW | P1 TO P2 kW | P2 TO P3 kW | ... |
|---|---|---|---|---|
| ELECTRIC RATE | X1 YEN PER 1 kW | X2 YEN PER 1 kW | X3 YEN PER 1 kW | ... |

FIG.2

POWER SUPPLY SYSTEM, CONTROL DEVICE OF POWER SUPPLY SYSTEM, OPERATION METHOD OF POWER SUPPLY SYSTEM, AND CONTROL METHOD OF POWER SUPPLY SYSTEM

RELATED APPLICATIONS

This application is the U.S. National Phase under 35 U.S.C. §371 of International Application No. PCT/JP2011/004393 filed on Aug. 3, 2011, which in turn claims the benefit of Japanese Application No. 2010-175549, filed on Aug. 4, 2010, the disclosures of which Applications are incorporated by reference herein.

TECHNICAL FIELD

The present invention relates to: a power supply system which includes a power generation system and an electrical storage unit configured to supply electric power to the power generation system and an external electrical load; a control device of the power supply system; an operation method of the power supply system; and a control method of the power supply system.

BACKGROUND ART

Conventionally, there are proposed electric rate simulation systems which change electric rate setting for a consumer in accordance with the amount of electric power consumed by the consumer (see Patent Literature 1, for example). Patent Literature 1 discloses an electric rate simulation system, which is configured to calculate an electric rate based on information about electric power usage by an electricity consumer, which electric power usage is measured for every predetermined period. The electric rate simulation system calculates the electric rate in a manner corresponding to various electric rate sign-up plans, including an electric rate sign-up plan in which the electric rate varies depending on what hours in a day the consumer uses electric power.

CITATION LIST

Patent Literature

PTL 1: Japanese Laid-Open Patent Application Publication No. 2008-146116

SUMMARY OF INVENTION

Technical Problem

Assume that, for example, a consumer uses a power generation system such as a fuel cell or a gas engine, and signs up for an electric rate system that varies an electric rate for the consumer in accordance with electric power usage by the consumer. Here, further assume that the power generation system is configured to stand ready for its start-up, or to interrupt its start-up process, when the start-up of the power generation system will result in that the electric power usage exceeds upper limit power, up to which the electric rate is kept relatively low. In this case, there arises a problem of low starting performance of the power generation system. Similarly, assume that the power generation system is configured to stand ready for stopping its power generation, or to interrupt its post-stop operation after stopping the power generation, when stopping of the power generation system will result in that the electric power usage exceeds the upper limit power, up to which the electric rate is kept relatively low. In this case, there arises a problem of low stopping performance of the power generation system.

The present invention provides a power supply system, an operation method of the power supply system, and a control device for use in a control method of the power supply system, which improve at least one of the starting performance and the stopping performance of a power generation system while suppressing an increase in electric rate for a consumer's home in the case of introducing such an electric rate system as described above, which varies the electric rate in accordance with electric power usage by the consumer.

Solution to Problem

In order to solve the above problems, a power supply system according to the present invention includes: a power generation system; an electrical storage unit configured to supply electric power to the power generation system and an external electrical load; and a control device configured to perform at least one of first control and second control. The control device performs the first control if, at start-up of the power generation system, it is predicted that a sum of start-up power for the power generation system and electric power consumed by the external electrical load exceeds upper limit power, up to which an electric rate is kept to a relatively low unit price, and that the electric rate is to be changed to a relatively high unit price. The first control is control of supplying electric power stored in the electrical storage unit to at least one of the power generation system and the external electrical load in order to prevent electric power supplied from the power grid from exceeding the upper limit power. The control device performs the second control if, at stopping of power generation of the power generation system, it is predicted that a sum of stopped-period power for the power generation system and electric power consumed by the external electrical load exceeds the upper limit power, up to which the electric rate is kept to a relatively low unit price, and that the electric rate is to be changed to a relatively high unit price. The second control is control of supplying electric power stored in the electrical storage unit to at least one of the power generation system and the external electrical load in order to prevent electric power supplied from the power grid from exceeding the upper limit power.

According to the above, in the case of introducing an electric rate system that varies an electric rate in accordance with electric power usage by a consumer, at least one of the starting performance and the stopping performance of the power generation system is improved while suppressing an increase in the electric rate for the consumer's home.

A control device of a power supply system, according to the present invention, is a control device configured to control the power supply system which includes: a power generation system; an external electrical load; and an electrical storage unit configured to supply electric power to the power generation system and the external electrical load. The control device of the power supply system is configured to perform at least one of first control and second control. The control device performs the first control if, at start-up of the power generation system, it is predicted that a sum of start-up power for the power generation system and electric power consumed by the external electrical load exceeds upper limit power, up to which an electric rate is kept to a relatively low unit price, and that the electric rate is to be changed to a relatively high unit price. The first control is control of supplying electric power stored in the electrical storage unit to at least one of the power generation system and the external electrical load in order to prevent electric power supplied from the power grid from exceeding the upper limit power. The control device performs the second control if, at stopping of power generation of the power generation system, it is predicted that a sum of stopped-period power for the power generation system and electric power consumed by the external electrical load exceeds the upper limit power, up to which the electric rate is kept to a relatively low unit price, and that the electric rate is to be changed to a relatively high unit price. The second control is control of supplying electric power stored in the electrical storage unit to at least one of the power generation system and the external electrical load in order to prevent electric power supplied from the power grid from exceeding the upper limit power.

According to the above, in the case of introducing an electric rate system that varies an electric rate in accordance with electric power usage by a consumer, at least one of the starting performance and the stopping performance of the power generation system is improved while suppressing an increase in the electric rate for the consumer's home.

An operation method of a power supply system, according to the present invention, includes performing at least one of first control and second control. The first control includes: at start-up of a power generation system, predicting whether a sum of start-up power for the power generation system and electric power consumed by the external electrical load exceeds upper limit power, up to which an electric rate is kept to a relatively low unit price, and the electric rate is to be changed to a relatively high unit price; and if the electric rate is predicted to be changed to the relatively high unit price, supplying electric power stored in the electrical storage unit to at least one of the power generation system and the external electrical load in order to prevent electric power supplied from the power grid from exceeding the upper limit power. The second control includes: at stopping of power generation of the power generation system, predicting whether a sum of stopped-period power for the power generation system and electric power consumed by the external electrical load exceeds the upper limit power, up to which the electric rate is kept to a relatively low unit price, and the electric rate is to be changed to a relatively high unit price; and if the electric rate is predicted to be changed to the relatively high unit price, supplying electric power stored in the electrical storage unit to at least one of the power generation system and the external electrical load in order to prevent electric power supplied from the power grid from exceeding the upper limit power.

According to the above, in the case of introducing an electric rate system that varies an electric rate in accordance with electric power usage by a consumer, at least one of the starting performance and the stopping performance of the power generation system is improved while suppressing an increase in the electric rate for the consumer's home.

A control method of a power supply system, according to the present invention, includes performing at least one of first control and second control. The first control includes: at start-up of a power generation system, predicting whether a sum of start-up power for the power generation system and electric power consumed by the external electrical load exceeds upper limit power, up to which an electric rate is kept to a relatively low unit price, and the electric rate is to be changed to a relatively high unit price; and if the electric rate is predicted to be changed to the relatively high unit price, supplying electric power stored in the electrical storage unit to at least one of the power generation system and the external electrical load in order to prevent electric power supplied from the power grid from exceeding the upper limit power. The second control includes: at stopping of power generation of the power generation system, predicting whether a sum of stopped-period power for the power generation system and electric power consumed by the external electrical load exceeds the upper limit power, up to which the electric rate is kept to a relatively low unit price, and the electric rate is to be changed to a relatively high unit price; and if the electric rate is predicted to be changed to the relatively high unit price, supplying electric power stored in the electrical storage unit to at least one of the power generation system and the external electrical load in order to prevent electric power supplied from the power grid from exceeding the upper limit power.

According to the above, in the case of introducing an electric rate system that varies an electric rate in accordance with electric power usage by a consumer, at least one of the starting performance and the stopping performance of the power generation system is improved while suppressing an increase in the electric rate for the consumer's home.

The above object, other objects, features, and advantages of the present invention will be made clear by the following detailed description of preferred embodiments with reference to the accompanying drawings.

Advantageous Effects of Invention

According to the power supply system, the control device of the power supply system, the operation method of the power supply system, and the control method of the power supply system of the present invention, in the case of introducing an electric rate system that varies an electric rate in accordance with electric power usage by a consumer, at least one of the starting performance and the stopping performance of the power generation system is improved while suppressing an increase in the electric rate for the consumer's home.

BRIEF DESCRIPTION OF DRAWINGS

FIG. 2 is a table schematically showing an example of an electric rate system that varies an electric rate in accordance with electric power usage by a consumer.

DESCRIPTION OF EMBODIMENTS

Figure 1:
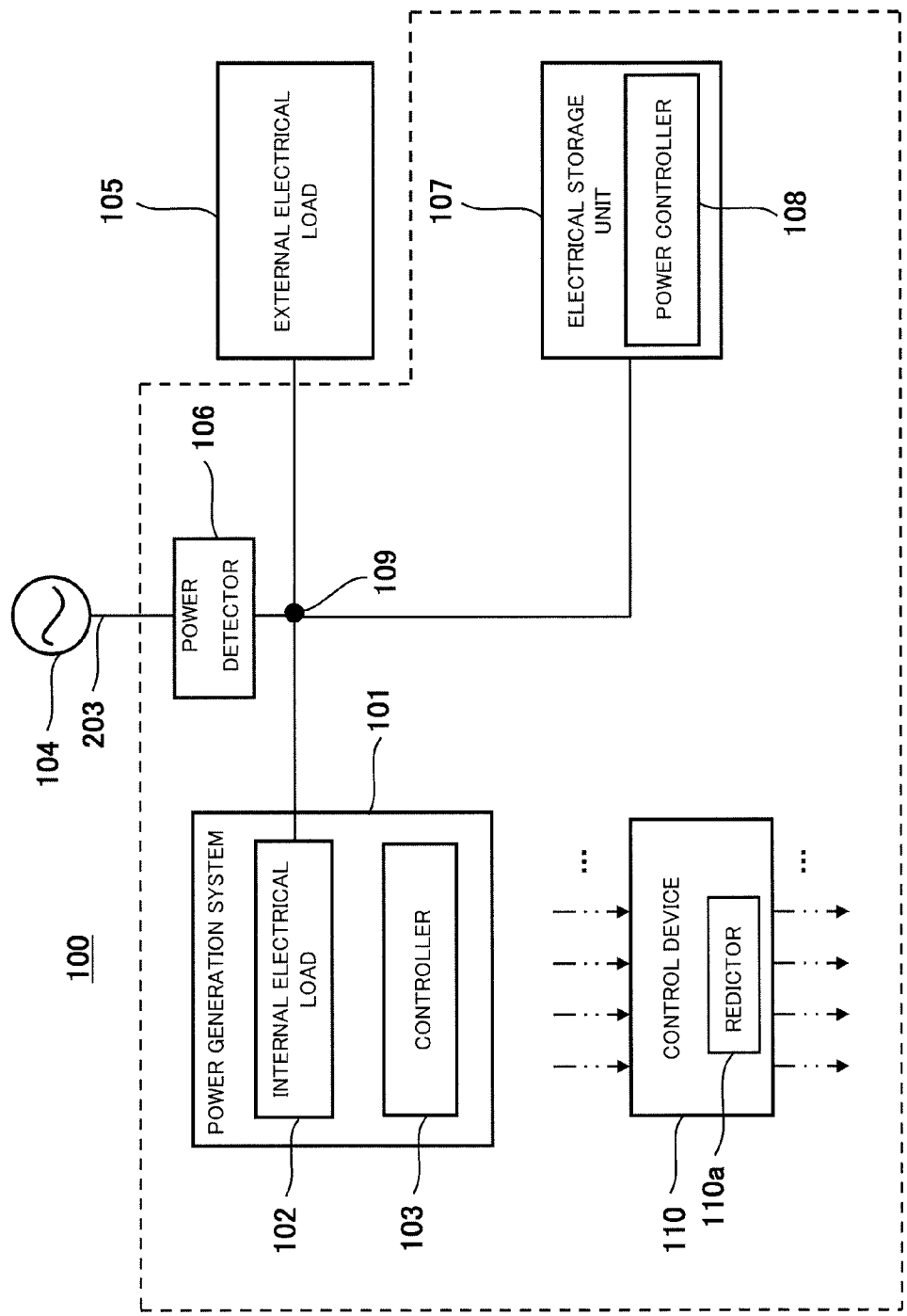
FIG. 1 is a block diagram schematically showing a configuration of a power supply system according to Embodiment 1 and a configuration of a control device of the power supply system.

Hereinafter, specific descriptions of exemplary embodiments of the present invention are given with reference to the drawings. In the drawings, the same or corresponding components are denoted by the same reference signs, and repetition of the same description is avoided. In the drawings, only the components necessary for describing the present invention are shown, and the other components are omitted. Further, the present invention is not limited to the following embodiments.

(Embodiment 1)

A power supply system according to Embodiment 1 includes: a power generation system; an electrical storage unit configured to supply electric power to the power generation system and an external electrical load; and a control device (control device of the power supply system). The control device is configured to perform at least one of first control and second control. The control device performs the first control if, at start-up of the power generation system, it is predicted that a sum of start-up power for the power generation system and electric power consumed by the external electrical load exceeds upper limit power, up to which an electric rate is kept to a relatively low unit price, and that the electric rate is to be changed to a relatively high unit price. The first control is control of supplying electric power stored in the electrical storage unit to at least one of the power generation system and the external electrical load in order to prevent electric power supplied from the power grid from exceeding the upper limit power. The control device performs the second control if, at stopping of power generation of the power generation system, it is predicted that a sum of stopped-period power for the power generation system and electric power consumed by the external electrical load exceeds the upper limit power, up to which the electric rate is kept to a relatively low unit price, and that the electric rate is to be changed to a relatively high unit price. The second control is control of supplying electric power stored in the electrical storage unit to at least one of the power generation system and the external electrical load in order to prevent electric power supplied from the power grid from exceeding the upper limit power.

According to the above, in the case of introducing an electric rate system that varies an electric rate in accordance with electric power usage by a consumer, at least one of the starting performance and the stopping performance of the power generation system is improved while suppressing an increase in the electric rate for the consumer's home.

It should be noted that "at start-up of the power generation system" refers to at least one of the following: when the power generation system is standing ready for start-up; and when the power generation system is performing a start-up operation. The description given below mainly relates to when the power generation system is standing ready for start-up.

Also, "at stopping of power generation of the power generation system" refers to at least one of the following: when the power generation system is standing ready to stop power generation; and when a post-stop operation after stopping the power generation of the power generation system is being performed. The description given below mainly relates to when the power generation system is standing ready to stop power generation.

[Configuration of Power Supply System]

FIG. 1 is a block diagram schematically showing a configuration of the power supply system according to Embodiment 1 and a configuration of the control device of the power supply system.

As shown in FIG. 1, a power supply system 100 according to Embodiment 1 includes: a power generation system 101; an electrical storage unit 107, and a control device 110 (control device of the power supply system). If, at start-up of the power generation system 101, the sum of start-up power for the power generation system 101 and electric power consumed by an external electrical load 105 exceeds upper limit power, up to which an electric rate is kept to a relatively low unit price, and the electric rate is to be changed to a relatively high unit price, the control device 110 performs control of supplying electric power stored in the electrical storage unit 107 to at least one of the power generation system 101 and the external electrical load 105 in order to prevent electric power supplied from a power grid 104 from exceeding the upper limit power. Specifically, "at start-up of the power generation system 101" refers to a period from the start of the start-up of the power generation system 101 to the start of electric power supply from the power generation system 101 to the external electrical load 105 and an internal electrical load 102 of the power generation system 101.

Described next with reference to FIG. 2 is a case where the sum of start-up power for the power generation system 101 and electric power consumed by the external electrical load 105 exceeds the upper limit power, up to which the electric rate is kept to a relatively low unit price, and the electric rate is changed to a relatively high unit price.

FIG. 2 is a table schematically showing an example of an electric rate system that varies an electric rate in accordance with electric power usage by a consumer.

Assume a case where, as shown in FIG. 2, the electric rate is set to X1 yen per 1 kW when electric power P used by the consumer is $0 \leq P \leq P1[kW]$, and the electric rate is set to X2 yen per 1 kW when the electric power P used by the consumer is $P1 < P \leq P2[kW]$ (here, $P1 < P2$ kW and $X1 < X2$ yen). Under such settings of the electric rate system, if the consumer is using the external electrical load 105 at P0 kW which is less than P1 kW, then the electric rate is X1 yen per 1 kW.

Meanwhile, assume a case where the power generation system 101 is started when the consumer is using the external electrical load 105 at P0 kW, and the sum of start-up power (Pa kW) for the power generation system 101 and the electric power (P0 kW) consumed by the external electrical load 105 (i.e., Pa+P0 kW) exceeds P1 kW. In this case, since the power sum exceeds the upper limit power (in this example, P1 kW), up to which the electric rate is kept to a relatively low unit price (in this example, X1 yen), the electric rate is changed to a relatively high unit price which is, in this example, X2 yen per 1 kW.

In the case of adopting such an electric rate system, if starting the power generation system 101 results in that the upper limit power, up to which the electric rate is kept to a relatively low unit price, is exceeded and the electric rate is changed to a relatively high unit price, then the consumer incurs a disadvantage due to the start-up. Therefore, in the power supply system 100 according to Embodiment 1, when the power generation system 101 is started, the control device 110 performs control of supplying electric power stored in the electrical storage unit 107 to at least one of the power generation system 101 and the external electrical load 105 so that electric power supplied from the power grid 104 will not exceed the upper limit power, up to which the electric rate is kept to a relatively low unit price.

Hereinafter, component devices of the power supply system 100 according to Embodiment 1 are described.

The power generation system 101 includes: the internal electrical load 102 which is a device for allowing the power generation system 101 to operate; and a controller 103 configured to control the power generation system 101. The power generation system 101 may be configured in any form, so long as the power generation system 101 is configured to generate electric power and supply the generated electric power to the external electrical load 105. The power generation system 101 may be, for example, a gas turbine or a fuel cell system. A fuel cell for use in the fuel cell system may be of any type. Examples of the fuel cell include a polymer electrolyte fuel cell, a solid oxide fuel cell, and a phosphoric-acid fuel cell. If the power generation system 101 is a fuel cell system, then the internal electrical load 102 may be, for example, an electric heater for increasing the internal temperature of the fuel cell.

The controller 103 may be configured as any device, so long as the device is configured to control component devices of the power generation system 101. For example, the controller 103 includes an arithmetic processing unit and a storage unit which stores a program for executing control operations. The arithmetic processing unit is configured as, for example, a microprocessor or a CPU, and the storage unit is configured as a memory or the like.

The electrical storage unit 107 includes a power controller 108 configured to control the electrical storage unit 107. The electrical storage unit 107 may be configured in any form, so long as the electrical storage unit 107 is configured to supply electric power to the power generation system 101 and the external electrical load 105. Examples of the electrical storage unit 107 include secondary batteries such as a lead-acid battery, a lithium battery, and a nickel-metal hydride battery. Such a secondary battery may be used in the form of a battery pack in which single cells are serially connected. Alternatively, the secondary battery may be used in such a manner that single cells and/or battery packs are connected in parallel.

The power controller 108 may be configured as any device, so long as the device is configured to control output power from the electrical storage unit 107. For example, the power controller 108 may be configured as a DC/AC converter.

The electrical storage unit 107 includes a built-in power detector (not shown) configured to detect output power (discharged power) from the electrical storage unit 107. The control device 110 is configured to obtain the output power from the electrical storage unit 107, which is detected by the power detector (not shown).

The power grid 104 is connected, at an interconnection point 109, to the power generation system 101 and the electrical storage unit 107 via wiring 203. A power detector 106 is provided on an electrical path (i.e., on the wiring 203) at a position closer to the power grid 104 than the interconnection point 109. The power detector 106 detects the value of a current supplied to at least one of the external electrical load 105 and the internal electrical load 102 of the power generation system 101. The control device 110 is configured to obtain the current value detected by the power detector 106. Here, the external electrical load 105 is, for example, a household electrical appliance.

For example, the control device 110 includes an arithmetic processing unit and a storage unit which stores a program for executing control operations. The arithmetic processing unit is configured as, for example, a microprocessor or a CPU, and the storage unit is configured as a memory or the like. A predictor 110a is realized by predetermined software stored in the storage unit. At start-up of the power generation system (in Embodiment 1, when the power generation system is standing ready for start-up), the predictor 110a predicts whether the sum of start-up power for the power generation system and electric power consumed by the external electrical load exceeds the upper limit power, up to which the electric rate is kept to a relatively low unit price, and the electric rate is to be changed to a relatively high unit price.

The control device 110 may be configured in any form, so long as the control device 110 is configured to control component devices of the power supply system 100. The control device 110 may be provided outside the power generation system 101 and the electrical storage unit 107 as shown in FIG. 1. Alternatively, the control device 110 may be incorporated either in the power generation system 101 or in the electrical storage unit 107. Further alternatively, the control device 110 may be configured as separate devices, each of which is incorporated in a corresponding one of the power generation system 101 and the electrical storage unit 107.

[Operations of Power Supply System]

Figure 3A:
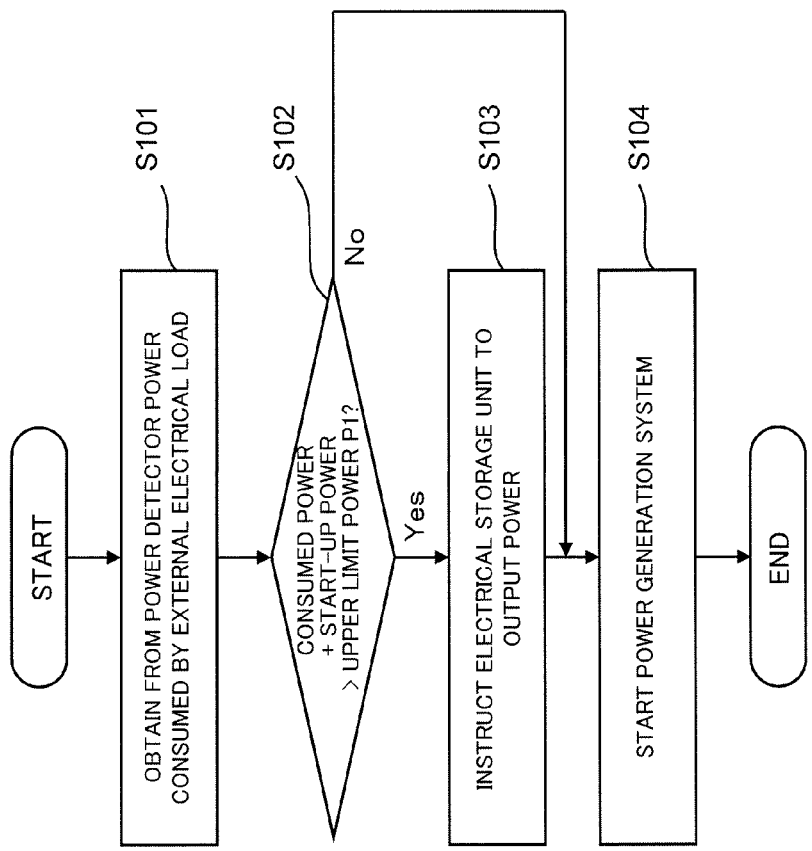
FIG. 3A is a flowchart schematically showing operations that the power supply system according to Embodiment 1 performs at start-up of its power generation system.

FIG. 3A is a flowchart schematically showing operations (first control) which the power supply system according to Embodiment 1 performs at start-up of the power generation system.

Here, assume that the power generation system 101 has not started and electric power is being supplied from the power grid 104 to the external electrical load 105. When the power generation system 101 is standing ready for start-up, the control device 110 obtains, from the power detector 106, electric power used by (consumed by) the external electrical load 105 (step S101).

Here, "when the power generation system 101 is standing ready for start-up" refers to at least one of the following: when a start-up request for the power generation system 101 has been generated; and when there is an upcoming scheduled start-up. Examples of when a start-up request has been generated include: when a start-up starting time preset for the power generation system 101 has arrived; and when a user has operated a remote controller to give an instruction to start the start-up of the power generation system 101. Also, examples of when there is an upcoming scheduled start-up include when a start-up starting time preset for the power generation system 101 is approaching.

In Embodiment 1, at a predetermined time before an operation start time of the power generation system 101 (e.g., one minute before the operation start time), the power detector 106 detects electric power consumed by the external electrical load 105, and the control device 110 (the predictor 110a) predicts whether the sum of start-up power for the power generation system 101 and the electric power consumed by the external electrical load 105 exceeds upper limit power receivable from the power grid 104. The predetermined time is set to a time at which the amount of electric power consumed by the external electrical load 105 at the start-up starting time can be predicted. It should be noted that the prediction by the control device 110 (the predictor 110a) as to whether the sum of the start-up power for the power generation system 101 and the electric power consumed by the external electrical load 105 exceeds the upper limit power, up to which the electric rate is kept to a relatively low unit price, and the electric rate is to be changed to a relatively high unit price, may be performed in any manner so long as it can be predicted whether the upper limit power is to be exceeded. For example, the prediction may be performed from past usage histories.

Next, the control device 110 determines whether the sum of the electric power consumed by the external electrical load 105, which is obtained in step S101, and the start-up power for the power generation system 101 exceeds the upper limit power P1, up to which the electric rate is kept to a relatively low unit price (step S102). If the sum of the consumed electric power and the start-up power exceeds the upper limit power P1 (Yes in step S102), the flow proceeds to step S103. On the other hand, if the sum is less than or equal to the upper limit power P1 (No in step S102), the flow proceeds to step S104.

The start-up power herein refers to electric power necessary for starting the power generation system 101. Specifically, the start-up power refers to electric power consumed by the internal electrical load 102 during a start-up operation of the power generation system 101. The value of the start-up power is suitably set in accordance with a device that serves as the internal electrical load 102. For example, the start-up power may be set to maximum electric power consumed by the internal electrical load 102 during the start-up operation of the power generation system 101, or may be set to electric power that the internal electrical load 102 consumes during its operation at an early stage of the start-up.

Moreover, the determination here is performed while the upper limit power, up to which the electric rate is kept to a relatively low unit price, is set to P1. However, the upper limit power is not limited to P1. For example, in the electric rate system shown in FIG. 2, if a case where the electric power P used by the consumer is in a range from P1 to P2 kW and a case where the electric power P used by the consumer is in a range from P2 to P3 kW are compared, then the unit price X2 yen of the electric rate in the case where the electric power P used by the consumer is in the range from P1 to P2 kW is the relatively low unit price of the electric rate. Here, the upper limit power, up to which the electric rate is kept to a relatively low unit price, is P2, and X3 yen is the relatively high unit price of the electric rate. That is, the upper limit power, up to which the electric rate is kept to a relatively low unit price, varies depending on the electric power P used by the consumer (i.e., depending on the electric power P used by the external electrical load 105).

In step S103, the control device 110 controls the power controller 108 of the electrical storage unit 107 to cause the electrical storage unit 107 to output electric power. Accordingly, the power controller 108 causes the electrical storage unit 107 to supply electric power to the external electrical load 105 and the power generation system 101 (specifically, the internal electrical load 102 of the power generation system 101). At the time, the power controller 108 controls the electrical storage unit 107, such that electric power obtained by subtracting the electric power supplied to the external electrical load 105 and/or the power generation system 101 from the sum of the electric power consumed by the external electrical load 105 and the start-up power for the power generation system 101 (i.e., consumed power+start-up power− supplied power) becomes less than or equal to the upper limit power P1.

Next, the control device 110 proceeds to step S104 in which the control device 110 outputs to the controller 103 a start-up permission signal (start-up command signal) for permitting the start-up of the power generation system 101. In response, the controller 103 starts the start-up of the power generation system 101.

As described above, even if electric power consumption by the external electrical load 105 is great and there is a risk that the start-up of the power generation system 101 may result in that the upper limit power (here, the upper limit power P1), up to which the electric rate is kept to a relatively low unit price, is exceeded, the power supply system 100 (the control device 110 of the power supply system 100) according to Embodiment 1 makes it possible to start the start-up of the power generation system 101 while suppressing an increase in the unit price of the electric rate. Thus, the power supply system 100 according to Embodiment 1 (the control device 110 of the power supply system 100) allows the electric rate to be kept low while improving the starting performance of the power generation system 101.

Described next is an example of operations (second control) which the power supply system 100 according to Embodiment 1 performs at stopping of power generation.

If power generation by the power generation system 101 is stopped, then the power generation system 101 stops supplying electric power to the external electrical load 105. Accordingly, when electric power consumption by the external electrical load 105 is great in a case where the electric rate system shown in FIG. 2 is adopted, stopping the power generation of the power generation system 101 may result in that the upper limit power, up to which the electric rate is kept to a relatively low unit price, is exceeded and the electric rate is changed to a relatively high unit price. In such a case, the consumer incurs a disadvantage due to the stopping of the power generation. Moreover, even if it is determined before stopping the power generation of the power generation system 101 that there is not a risk that the upper limit power, up to which the electric rate is kept to a relatively low unit price, is exceeded and then the power generation of the power generation system 101 is stopped, there is still a possibility that thereafter the amount of electric power consumed by the external electrical load 105 increases, which results in the electric rate being changed to a relatively high unit price.

Therefore, in the power supply system 100 according to Embodiment 1, at stopping of the power generation of the power generation system 101, the control device 110 performs control of supplying electric power stored in the electrical storage unit 107 to at least one of the power generation system 101 and the external electrical load 105 so that electric power supplied from the power grid 104 will not exceed the upper limit power, up to which the electric rate is kept to a relatively low unit price.

Figure 3B:
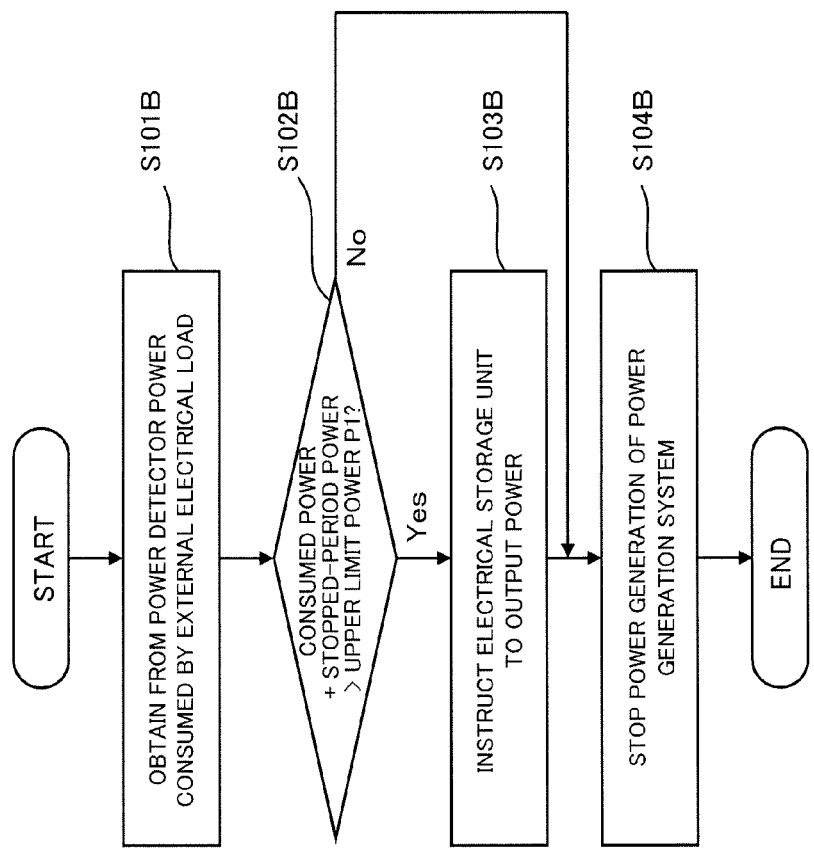
FIG. 3B is a flowchart schematically showing operations that the power supply system according to Embodiment 1 performs at stopping of power generation of the power generation system.

FIG. 3B is an example of a flowchart schematically showing operations that the power supply system according to Embodiment 1 performs at stopping of the power generation of the power generation system.

Here, assume that the power generation system 101 is performing a power generation operation and stopping of the power generation has not started. When the power generation system 101 is standing ready to stop the power generation, the control device 110 obtains, from the power detector 106, electric power used by (consumed by) the external electrical load 105 (step S101B).

Here, "when the power generation system 101 is standing ready to stop the power generation" refers to at least one of the following: when a stop request for the power generation system has been generated; and when there is an upcoming scheduled power generation stop. Examples of when a stop request for the power generation system has been generated include: when a power generation stop starting time preset for the power generation system has arrived; and when a user has operated a remote controller to give an instruction to stop the power generation of the power generation system 101. Also, examples of when there is an upcoming scheduled power generation stop include when a power generation stop starting time preset for the power generation system is approaching.

Next, the control device 110 determines (i.e., predicts) whether the sum of the electric power consumed by the external electrical load 105, which is obtained in step S101B, and stopped-period power for the power generation system 101 exceeds upper limit power P1B available from the power grid 104 (step S102B). If the sum of the consumed electric power and the start-up power exceeds the upper limit power P1B (Yes in step S102B), the flow proceeds to step S103B. On the other hand, if the sum is less than or equal to the upper limit power P1B (No in step S102B), the flow proceeds to step S104B.

The stopped-period power herein refers to electric power necessary for a post-stop operation after stopping the power generation of the power generation system 101. Specifically, the stopped-period power refers to electric power consumed by the internal electrical load 102 when it operates during the post-stop operation after stopping the power generation of the power generation system 101. The value of the stopped-period power is set appropriately. For example, the stopped-period power may be set to maximum electric power consumed by the internal electrical load 102 during the post-stop operation after stopping the power generation of the power generation system 101. It should be noted that the post-stop operation after stopping the power generation of the power generation system 101 may be any post-stop operation that publicly known power generation systems perform after stopping their power generation.

In step S103B, the control device 110 controls the power controller 108 to cause the electrical storage unit 107 to output electric power. Accordingly, the power controller 108 causes the electrical storage unit 107 to supply electric power to the external electrical load 105 and the power generation system 101 (specifically, the internal electrical load 102 of the power generation system 101).

At the time, the power controller 108 controls the output power of the electrical storage unit 107, such that electric power obtained by subtracting the electric power supplied to the external electrical load 105 and the power generation system 101 from the sum of the electric power consumed by the external electrical load 105 and the stopped-period power for the power generation system 101 (i.e., consumed power+ stopped-period power−supplied power) becomes less than or equal to the upper limit power P1. It should be noted that when controlling the electrical storage unit 107, the power controller 108 may control the electrical storage unit 107 to supply electric power to at least the external electrical load 105.

Next, the control device 110 proceeds to step S104B, in which the control device 110 outputs to the controller 103 a signal for permitting stopping of the power generation of the power generation system 101 (power generation stop command signal). In response, the controller 103 starts stopping the power generation of the power generation system 101. Specifically, electric power supply from the power generation system 101 to the external electrical load 105 is stopped, and the power generation system 101 stops generating electric power. Thereafter, stopping of operations of component devices of the power generation system 101 is performed (i.e., the post-stop operation after stopping the power generation of the power generation system 101).

As described above, even if electric power consumption by the external electrical load 105 is great and it is predicted that stopping of the operation of the power generation system 101 results in that the upper limit power P1 supplied from the power grid 104 is exceeded, the power supply system 100 and the control device 110 of the power supply system 100, according to Embodiment 1, make it possible to start stopping the power generation of the power generation system 101.

It should be noted that the above description of the power supply system 100 describes the control operation that the control device 110 performs to control the electrical storage unit 107 when starting the power generation system 101 and the control operation that the control device 110 performs to control the electrical storage unit 107 when stopping the power generation of the power generation system 101. However, as an alternative, the control device 119 of the power supply system 100 according to Embodiment 1 may be configured to perform at least one of the control operations (i.e., at least one of the first control and the second control). That is, the control device 110 may be configured to perform either the first control or the second control, or may be configured to perform both of the first control and the second control.

[Variation 1]

A power supply system according to Variation 1 serves as an example in which the power generation system is configured as a fuel cell system.

Figure 4A:
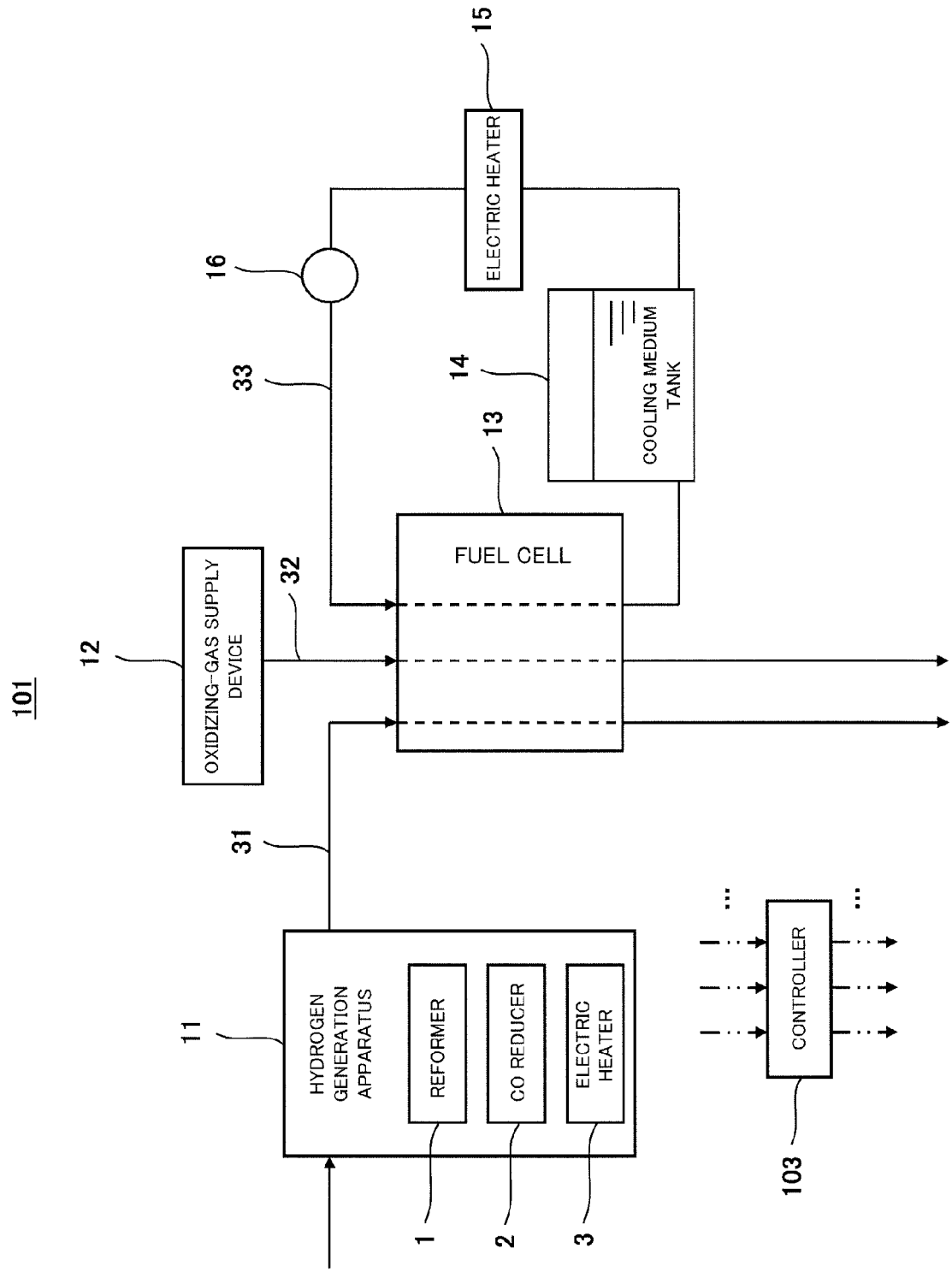
FIG. 4A is a block diagram schematically showing a configuration of a power generation system in a power supply system according to Variation 1 of Embodiment 1.

FIG. 4A is an example of a block diagram schematically showing a configuration of the power generation system in the power supply system according to Variation 1 of Embodiment 1.

As shown in FIG. 4A, the power generation system 101 according to Variation 1 is a fuel cell system which includes, as an internal electrical load, an electric heater for increasing the temperature of a component device of the fuel cell system at start-up of the fuel cell system. Specifically, the power generation system (fuel cell system) 101 according to Variation 1 includes: a hydrogen generation apparatus 11; an oxidizing gas supply device 12; a fuel cell 13; a cooling medium tank 14; an electric heater 15; a cooling medium delivery device 16; and the controller 103.

The hydrogen generation apparatus 11 includes a reformer 1, a CO reducer 2, and an electric heater 3. The hydrogen generation apparatus 11 is configured to generate a hydrogen-rich fuel gas, and to supply the generated fuel gas to the fuel cell 13. The reformer 1 includes a reforming catalyst, which causes a reforming reaction between a raw material and water to generate a hydrogen-containing gas. It should be noted that the raw material may be any material, so long as a hydrogen-containing gas can be generated through a reforming reaction using the raw material and steam. A material usable as the raw material is one containing an organic compound of which the constituent elements are at least carbon and hydrogen. Examples of a material usable as the raw material include hydrocarbons, such as ethane and propane, and alcohol-based raw materials such as methanol.

The CO reducer 2 is configured to reduce carbon monoxide contained in the hydrogen-containing gas generated by the reformer 1. The CO reducer 2 is, for example, a shift converter configured to reduce carbon monoxide through a shift reaction, or a CO remover configured to reduce carbon monoxide through an oxidation reaction or methanation reaction. The electric heater 3 is configured to increase the temperature of, for example, the CO reducer 2 at start-up of the fuel cell system. It should be noted that the electric heater 3 may be configured not only to increase the temperature of the CO reducer 2 but also to increase the temperature of the reformer 1. Alternatively, the electric heater 3 may be configured to increase the temperature of only the reformer 1.

Then, the hydrogen-containing gas, the carbon monoxide of which has been reduced by the CO reducer 2, is supplied as a fuel gas to an anode of the fuel cell 13 through a fuel gas supply passage 31. Although in Variation 1 the hydrogen-containing gas generated by the reformer 1 is supplied to the fuel cell 13 after the carbon monoxide in the hydrogen-containing gas is reduced by the CO reducer 2, Variation 1 is not limited to this. Alternatively, the hydrogen generation apparatus 11 need not include the CO reducer 2. In the case where the hydrogen generation apparatus 11 does not include the CO reducer 2, the electric heater 3 may be configured to increase the temperature of the reformer 1, or the hydrogen generation apparatus 11 need not include the electric heater 3.

The fuel cell system 101 includes: an oxidizing gas supply passage 32 through which an oxidizing gas flows; and the oxidizing gas supply device 12 for supplying the oxidizing gas. For example, a fan device such as a blower, sirocco fan, or the like may be used as the oxidizing gas supply device 12. The oxidizing gas supplied from the oxidizing gas supply device 12 (e.g., air) is supplied to a cathode of the fuel cell 13.

In the fuel cell 13, the fuel gas supplied to the anode and the oxidizing gas supplied to the cathode electrochemically react with each other, and as a result, electric power and heat are generated. The fuel cell 13 may be of any type. Examples of the fuel cell include a polymer electrolyte fuel cell, a solid oxide fuel cell, and a phosphoric-acid fuel cell. It should be noted that if the fuel cell is a solid oxide fuel cell, the fuel cell system 101 does not include the CO reducer 2, and the reformer 1 and the fuel cell 13 are incorporated in a single container.

The fuel cell system 101 also includes a cooling medium passage 33, the cooling medium tank 14, the electric heater 15, and the cooling medium delivery device 16. The cooling medium passage 33 is a passage through which a cooling medium flows, the cooling medium serving to recover heat generated by the fuel cell 13. The cooling medium tank 14 is provided on the cooling medium passage 33, and stores the cooling medium therein. The electric heater 15 may be provided at any position on the cooling medium passage 33, so long as the electric heater 15 heats the cooling medium within the cooling medium passage 33. For example, as shown in FIG. 4A, the electric heater 15 may be provided on the cooling medium passage 33 at a position outside the fuel cell 13 and outside the cooling medium tank 14. Alternatively, the electric heater 15 may be provided within the cooling medium tank 14. At start-up of the fuel cell system, the electric heater 15 operates to heat the cooling medium, and the cooling medium that has been heated circulates within the cooling medium passage 33. As a result, the temperature of the fuel cell 13 increases.

The cooling medium delivery device 16 is a device for causing the cooling medium to circulate within the cooling medium passage 33. For example, a pump may be used as the cooling medium delivery device 16. Here, for example, water or an antifreezing fluid (e.g., ethylene glycol-containing solution) may be used as the cooling medium.

As with the power supply system 100 according to Embodiment 1, in the power supply system 100 according to Variation 1 with the above-described configuration, the control operation (the first control) of controlling the electrical storage unit 107 is performed at start-up of the power generation system 101. Therefore, the power supply system 100 according to Variation 1 provides the same operational advantages as those of the power supply system 100 according to Embodiment 1.

In particular, in Variation 1, the electric heater 15 is configured to increase the temperature of a component device of the fuel cell system 101 in the start-up operation. This causes an increase in the start-up power. Accordingly, as compared to conventional power generation systems, the fuel cell system 101 according to Variation 1 is significantly superior in terms of providing a starting performance improving effect, which is obtained through the control by the control device 110 of the power supply system 100.

Although the fuel cell system 101 according to Variation 1 includes the electric heater 3 and the electric heater 15 as electric heaters for increasing the temperature of component devices of the fuel cell system at start-up, Variation 1 is not limited to this. For example, the fuel cell system 101 may include either the electric heater 3 or the electric heater 15, or the fuel cell system 101 may include a different electric heater.

The post-stop operation performed after stopping the power generation of the fuel cell system 101 in the power supply system 100 according to Variation 1 may be any of various publicly known operations. Examples of the post-stop operation after stopping the power generation of the fuel cell system 101 include: a cooling medium circulating operation which the cooling medium delivery device 16 performs to circulate the cooling medium within the cooling medium passage 33; a raw material gas purge operation which a raw material gas supply device (not shown) performs on at least one of an internal gas channel of the hydrogen generation apparatus 11 and an internal gas channel of the fuel cell 13; and an operation of operating the electric heater 15. It should be noted that the electric heater 15 may be operated in the aforementioned cooling medium circulating operation.

As with the power supply system 100 according to Embodiment 1, in the power supply system 100 according to Variation 1 with the above-described configuration, the control operation (the second control) of controlling the electrical storage unit 107 is performed at stopping of the power generation system 101. Therefore, the power supply system 100 according to Variation 1 provides the same operational advantages as those of the power supply system 100 according to Embodiment 1.

In particular, in Variation 1, the stopped-period power is increased in a case where the electric heater 15 is configured to increase the temperature of a component device of the fuel cell system 101 during the post-stop operation after stopping the power generation of the fuel cell system 101. Accordingly, as compared to conventional power generation systems, the fuel cell system 101 according to Variation 1 is significantly superior in terms of providing a stopping performance improving effect, which is obtained through the control by the control device 110 of the power supply system 100.

It should be noted that the control device 110 of the power supply system 100 according to Variation 1 may be configured to perform at least one of the following control operations: the control operation of controlling the electrical storage unit 107 at start-up of the power generation system 101; and the control operation of controlling the electrical storage unit 107 at stopping of the power generation of the power generation system 101. That is, the control device 110 may be configured to perform either the control operation of controlling the electrical storage unit 107 at start-up of the power generation system 101 or the control operation of controlling the electrical storage unit 107 at stopping of the power generation of the power generation system 101. Alternatively, the control device 110 may be configured to perform both the control operation of controlling the electrical storage unit 107 at start-up of the power generation system 101 and the control operation of controlling the electrical storage unit 107 at stopping of the power generation of the power generation system 101.

[Variation 2]

A power supply system according to Variation 2 serves as another example in which the power generation system is configured as a fuel cell system.

Figure 4B:
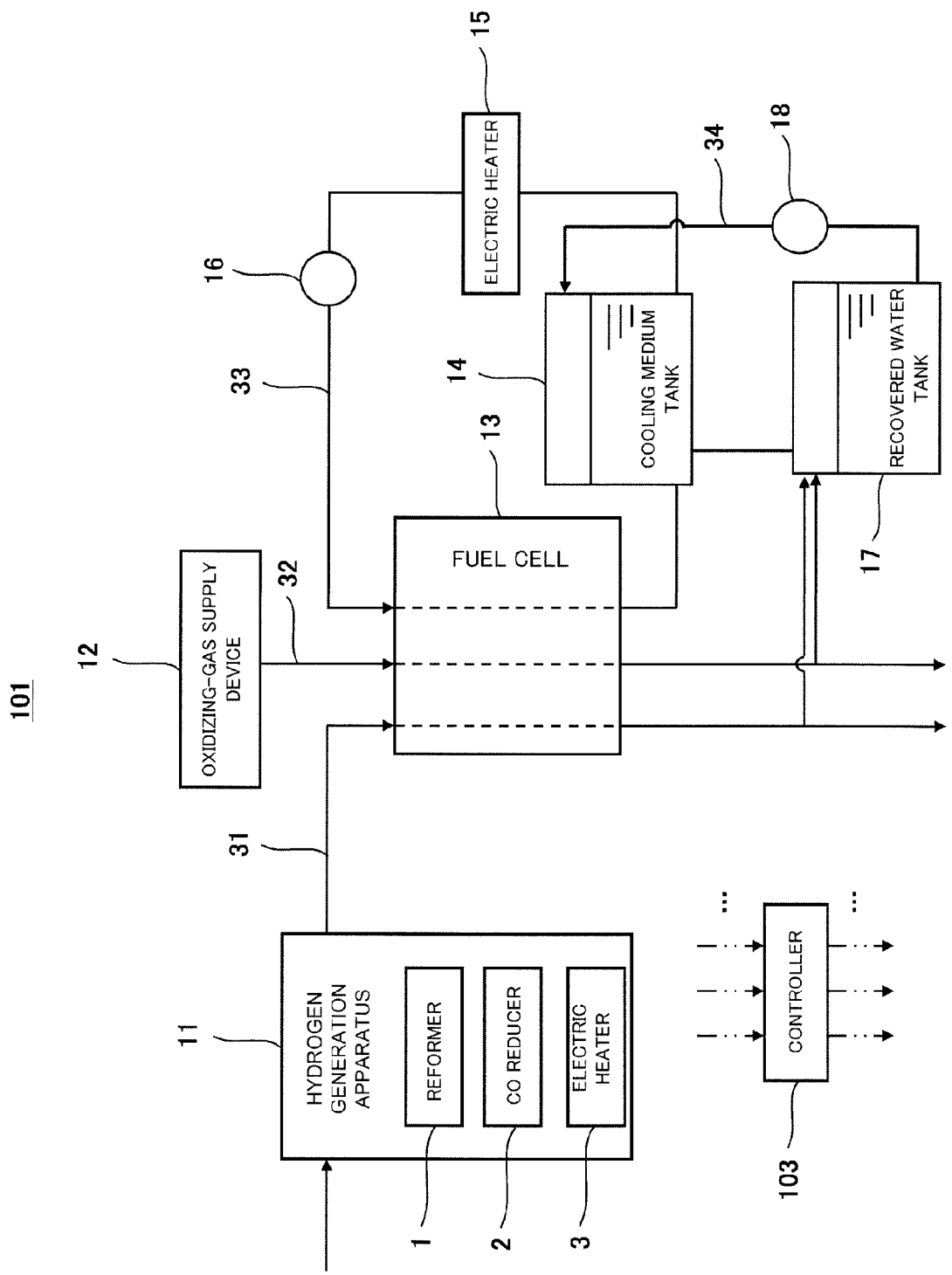
FIG. 4B is an example of a block diagram schematically showing a configuration of a power generation system in a power supply system according to Variation 2 of Embodiment 1.

FIG. 4B is an example of a block diagram schematically showing a configuration of the power generation system in the power supply system according to Variation 2 of Embodiment 1.

As shown in FIG. 4B, the fundamental configuration of the power generation system 101 according to Variation 2 is the same as that of the fuel cell system according to Variation 1. However, the power generation system 101 according to Variation 2 is different from the fuel cell system according to Variation 1 in that the power generation system 101 according to Variation 2 further includes a recovered water tank 17 and a delivery device 18. It should be noted that the electric heater 15 may be included in the recovered water tank 17.

The recovered water tank 17 stores water that is recovered from an exhaust gas discharged in the fuel cell system 101. The exhaust gas may be any exhaust gas. For example, the exhaust gas is at least one of the fuel gas and the oxidizing gas that are discharged from the fuel cell 13, or is a flue gas discharged from a combustor which heats the reformer 1.

The fuel cell system 101 includes a circulation passage 34 which connects between the cooling medium tank 14 and the recovered water tank 17. Accordingly, in Variation 2, water is used as a cooling medium, and the circulation passage 34 is configured such that cooling water in the cooling medium tank 14 and recovered water in the recovered water tank 17 circulate within the circulation passage 34. The delivery device 18 for sending out water from the inside of the circulation passage 34 is provided along the circulation passage 34. For example, a pump may be used as the delivery device 18.

It should be noted that if the fuel cell 13 is a solid oxide fuel cell, then the cooling medium passage 33 is configured not as a passage through which a cooling medium that cools down the fuel cell 13 flows, but as a passage through which a cooling medium that cools down the flue gas flows, which flue gas is generated when the fuel gas discharged from the fuel cell 13 is combusted.

The post-stop operation performed after stopping the power generation of the fuel cell system 101 in the power supply system 100 according to Variation 2 may be any of various publicly known operations. Examples of the post-stop operation after stopping the power generation of the fuel cell system 101 include: a cooling medium circulating operation which the cooling medium delivery device 16 performs to circulate the cooling medium within the cooling medium passage 33; a water circulating operation which the delivery device 18 performs to circulate water between the cooling medium tank 14 and the recovered water tank 17; a raw material gas purge operation which the raw material gas supply device (not shown) performs on at least one of the internal gas channel of the hydrogen generation apparatus 11 and the internal gas channel of the fuel cell 13; and an operation of operating the electric heater 15. It should be noted that the electric heater 15 may be operated in at least one of the following operations: the cooling medium circulating operation; and the water circulating operation of circulating water between the cooling medium tank 14 and the recovered water tank 14.

As with the power supply system according to Embodiment 1, in the power supply system 100 according to Variation 2 with the above-described configuration, the control operations (the first control and the second control) of controlling the electrical storage unit 107 are performed at start-up of and at stopping of the power generation system 101, respectively. Thus, the power supply system 100 according to Variation 2 operates in a similar manner to the power supply system 100 according to Embodiment 1, and yet provides the same operational advantages as those of the power supply system 100 according to Variation 2.

It should be noted that the control device 110 of the power supply system 100 according to Variation 2 may be configured to perform at least one of the following control operations: the control operation of controlling the electrical storage unit 107 at start-up of the fuel cell system 101; and the control operation of controlling the electrical storage unit 107 at stopping of the power generation of the fuel cell system 101. That is, the control device 110 may be configured to perform either the control operation of controlling the electrical storage unit 107 at start-up of the fuel cell system 101 or the control operation of controlling the electrical storage unit 107 at stopping of the power generation of the fuel cell system 101. Alternatively, the control device 110 may be configured to perform both the control operation of controlling the electrical storage unit 107 at start-up of the fuel cell system 101 and the control operation of controlling the electrical storage unit 107 at stopping of the power generation of the fuel cell system 101.

[Variation 3]

In a power supply system according to Variation 3, the control device includes: a determiner configured to determine cost advantage information which is obtained when the control device performs at least one of the first control and the second control; and an external output device configured to output, to outside, the cost advantage information determined by the determiner.

The power supply system according to Variation 3 may further include a display device configured to display the cost advantage information outputted from the external output device.

Figure 4C:
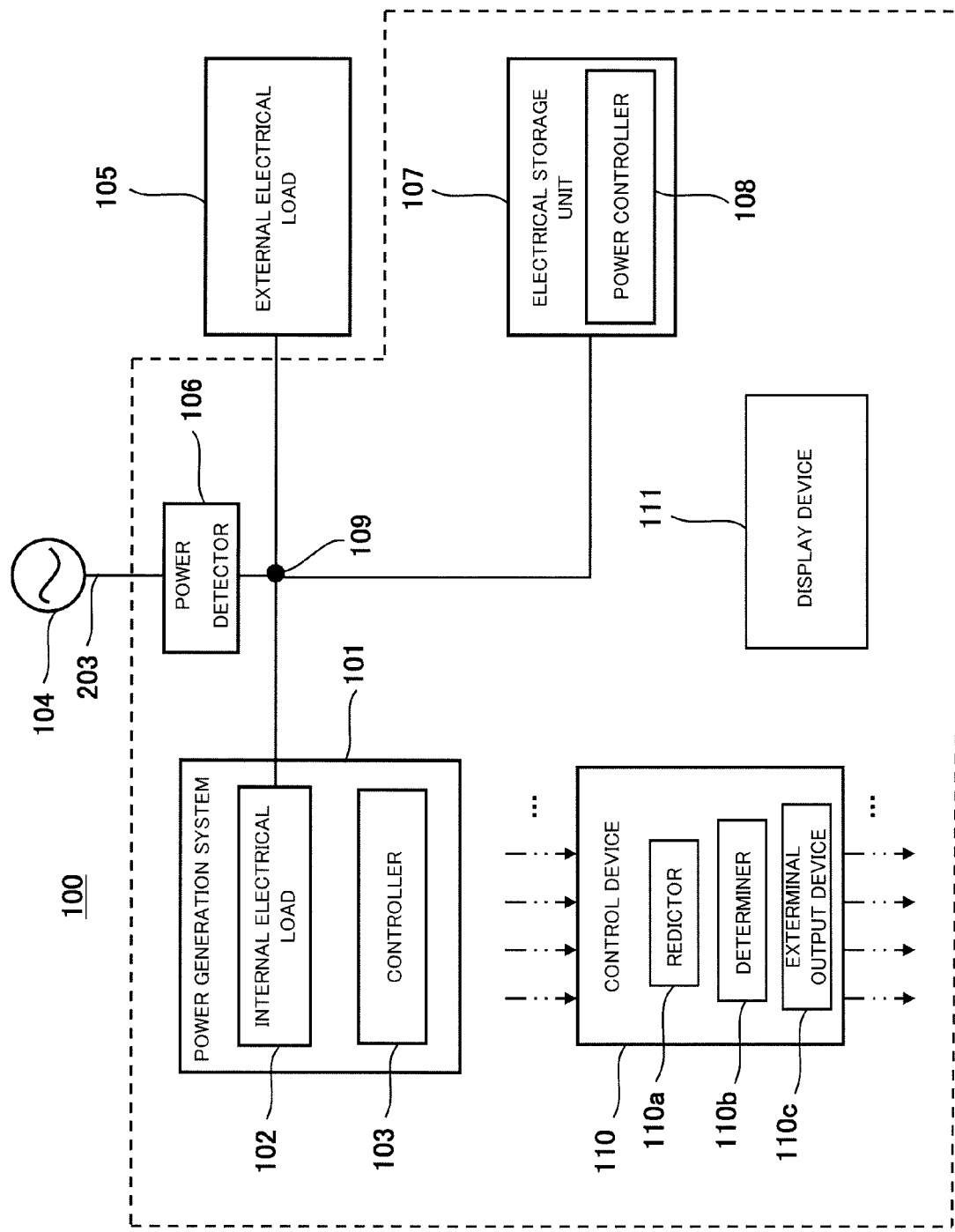
FIG. 4C is an example of a block diagram schematically showing a configuration of a power supply system according to Variation 2 of Embodiment 1.

FIG. 4C is an example of a block diagram schematically showing a configuration of the power supply system according to Variation 2 of Embodiment 1.

As shown in FIG. 4C, in the power supply system according to Variation 2, the control device 110 includes a determiner 110b and an external output device 110c. The determiner 110b is configured to determine cost advantage information which is obtained as a result of performing at least one of the first control and the second control. The external output device 110c is configured to output to the outside the cost advantage information determined by the determiner 110b. The cost advantage information herein refers to information indicating a cost advantage that is obtained when at least one of the first control and the second control is performed, as compared to when none of the first control and the second control is performed.

The determiner 110b is realized as a result that the arithmetic processing unit executes predetermined software stored in the storage unit of the control device 110. Based on, for example, the table of the electric rate system shown in FIG. 2, the determiner 110b may determine the cost advantage information, which is obtained as a result of performing at least one of the first control and the second control.

For example, when at least one of the first control and the second control is performed, the electric rate is kept to a relatively low unit price (e.g., X1 yen). If none of the first and second controls is performed, it may result in that the upper limit power (in this example, P1 kW) is exceeded and the electric rate is changed to a relatively high unit price (in this example, X2 yen). In such a case, the determiner 110b may determine X2-X1 yen/kW to be the cost advantage information obtained as a result of performing at least one of the first control and the second control.

Alternatively, in such a case as described above, the determiner 110b may determine the relatively low unit price (in this example, X1 yen) to which the electric rate is kept when the above-described control is performed, and the relatively high unit price (in this example, X2 yen) to which the electric rate is changed when the above-described control is not performed, to be the cost advantage information.

The external output device 110c may be configured in any form, so long as the external output device 110c is configured to output to the outside the cost advantage information determined by the determiner 110b. For example, a wireless LAN device or the like may be used as the external output device 110c. It should be noted that the external output device 110c may be configured to output, to the outside, information such as: the amount of electric power generated by the power generation system 101; output power from and/or the amount of electric power stored in the electrical storage unit 107; and the amount of electric power consumed by the external electrical load 105.

The power supply system 100 also includes a display device 111. The display device 111 may be configured in any form, so long as the display device 111 is configured to display information (character data, image data, etc.) outputted from the external output device 110b. For example, a remote controller or the like may be used as the display device 111. Not only the display device 111 included in the power supply system 100 but also a display device, which is not shown, provided outside of the power supply system 100 may display the information outputted from the external output device 110c. Such an external display device may be, for example, a mobile phone, a smartphone, or a tablet computer.

Hereinafter, a specific description is given of the cost advantage information displayed on the display device 111. For example, if the determiner 110b determines X2-X1 yen/kW to be the cost advantage information, then the display device 111 displays a message such as "Electricity is saved by X2-X1 yen/kW". Also, for example, the determiner 110b determines a relatively low unit price (in this example, X1 yen) to which the electric rate is kept when the above-described control is performed, and a relatively high unit price (in this example, X2 yen) to which the electric rate is changed when the above-described control is not performed, to be the cost advantage information. At the time, the display device 111 displays a message such as "the electricity unit price under low-cost operation is X1 yen/kW, and the electricity unit price will increase to X2 yen/kW if the low-cost operation is not performed".

As with the power supply system according to Embodiment 1, in the power supply system 100 according to Variation 3 with the above-described configuration, the control operations (the first control and the second control) of controlling the electrical storage unit 107 are performed at start-up of and at stopping of the power generation system 101, respectively. Therefore, the power supply system 100 according to Variation 3 provides the same operational advantages as those of the power supply system 100 according to Embodiment 1.

In the power supply system 100 according to Variation 3, the determiner 110b determines the cost advantage information when the first control and the second control are performed, and the external output device 110c outputs to the display device 111 the cost advantage information determined by the determiner 110b. This raises the awareness of the user of the power generation system 101 about energy saving.

Although the power supply system 100 according to Variation 3 includes the display device 111, Variation 3 is not limited to this. The power supply system 100 according to Variation 3 need not include the display device 111. In the case where the power supply system 100 according to Variation 3 does not include the display device 111, the aforementioned external display device displays the information outputted from the external output device 110c.

The control device 110 of the power supply system 100 according to Variation 3 may be configured to perform at least one of the following control operations: the control operation of controlling the electrical storage unit 107 at start-up of the power generation system 101; and the control operation of controlling the electrical storage unit 107 at stopping of the power generation of the power generation system 101. That is, the control device 110 may be configured to perform either the control operation of controlling the electrical storage unit 107 at start-up of the power generation system 101 or the control operation of controlling the electrical storage unit 107 at stopping of the power generation of the power generation system 101. Alternatively, the control device 110 may be configured to perform both the control operation of controlling the electrical storage unit 107 at start-up of the power generation system 101 and the control operation of controlling the electrical storage unit 107 at stopping of the power generation of the power generation system 101.

(Embodiment 2)

In a power supply system according to Embodiment 2, the control device is configured to determine whether to permit or reject the start-up of the power generation system, based on suppliable electric power from the electrical storage unit.

Here, "based on suppliable electric power from the electrical storage unit" means that the following is used as a reference for the determination: whether or not electric power obtained by subtracting electric power suppliable by the electrical storage unit from the sum of electric power consumed by the external electrical load and start-up power for the power generation system is less than or equal to the upper limit power, up to which the electric rate is kept to a relatively low unit price.

Further, in the power supply system according to Embodiment 2, the control device may be configured to determine whether to permit or reject the stopping of the power generation of the power generation system, based on suppliable electric power from the electrical storage unit.

Since the fundamental configuration of the power supply system 100 according to Embodiment 2 is the same as that of the power supply system 100 according to Embodiment 1, the configuration of the power supply system 100 according to Embodiment 2 will not be described below.

Figure 5A:
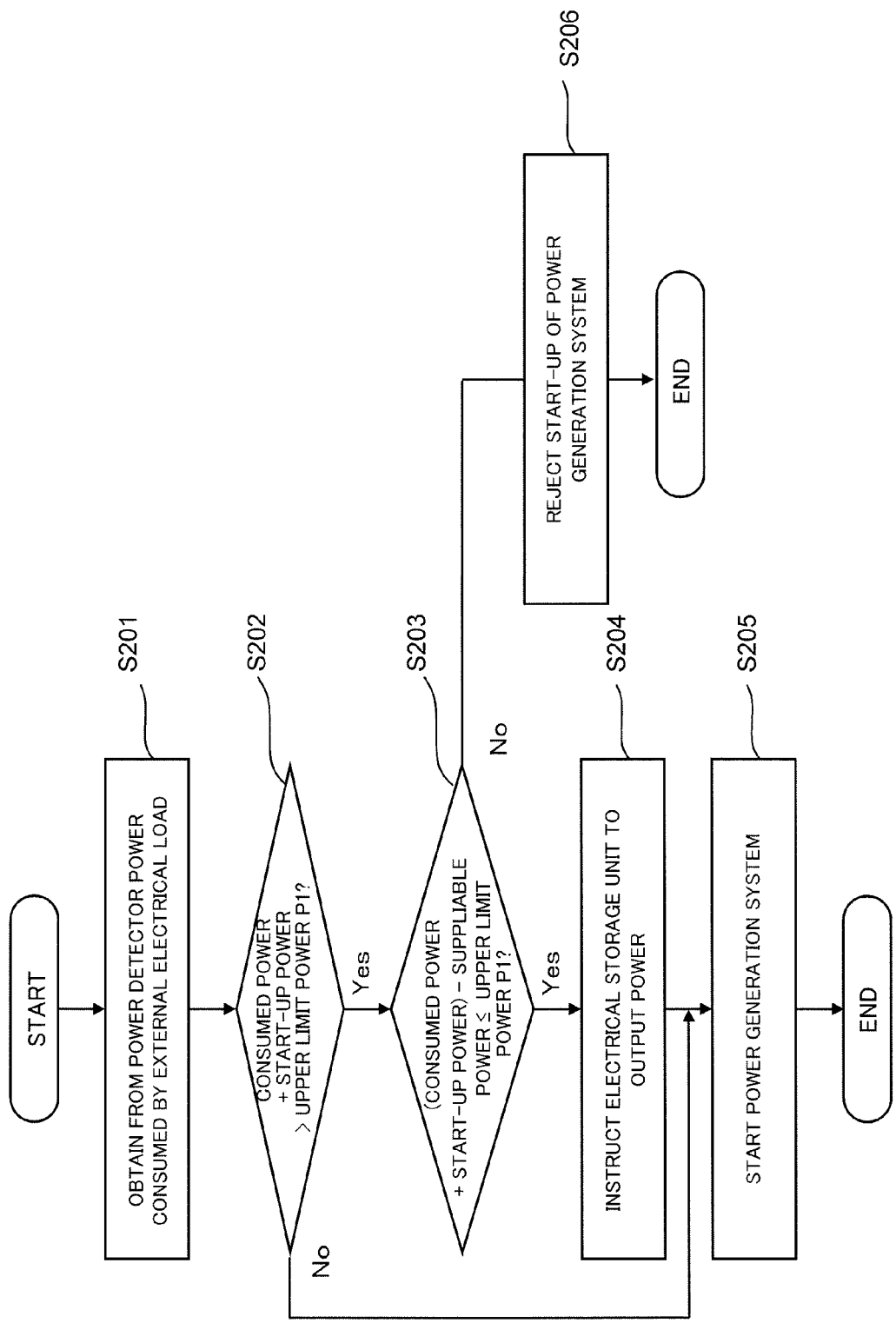
FIG. 5A is a flowchart schematically showing operations that a power supply system according to Embodiment 2 performs at start-up of its power generation system.

FIG. 5A is a flowchart schematically showing operations that the power supply system according to Embodiment 2 performs at start-up of the power generation system.

As shown in FIG. 5A, as with the power supply system 100 according to Embodiment 1, when the power generation system 101 is standing ready for start-up, the control device 110 obtains, from the power detector 106, electric power used by (consumed by) the external electrical load 105 (step S201).

Next, the control device 110 determines whether the sum of the electric power consumed by the external electrical load 105, which is obtained in step S201, and start-up power for the power generation system 101 exceeds the upper limit power (here, upper limit power P1), up to which the electric rate is kept to a relatively low unit price (step S202). If the sum of the consumed electric power and the start-up power exceeds the upper limit power P1 (Yes in step S202), the flow proceeds to step S203. On the other hand, if the sum is less than or equal to the upper limit power P1 (No in step S202), the flow proceeds to step S205.

In step S203, the control device 110 determines whether or not electric power obtained by subtracting electric power suppliable by the electrical storage unit 107 from the sum of the electric power consumed by the external electrical load 105 and the start-up power for the power generation system 101 (i.e., consumed power+start-up power−suppliable power) is less than or equal to the upper limit power (here, the upper limit power P1), up to which the electric rate is kept to a relatively low unit price. It should be noted that "based on supppliable electric power from the electrical storage unit" herein means that the following is used as a reference for the determination: whether or not the electric power obtained by subtracting the electric power suppliable by the electrical storage unit 107 from the sum of the electric power consumed by the external electrical load 105 and the start-up power for the power generation system 101 is less than or equal to the upper limit power, up to which the electric rate is kept to a relatively low unit price.

If the electric power obtained by subtracting the suppliable electric power from the sum of the consumed electric power and the start-up power is less than or equal to the upper limit power P1 (Yes in step S203), then the control device 110 controls the power controller 108 to cause the electrical storage unit 107 to output electric power (step S204). Accordingly, the power controller 108 causes the electrical storage unit 107 to supply electric power to the external electrical load 105 and the power generation system 101 which has started the start-up. At the time, the power controller 108 controls the electrical storage unit 107, such that electric power obtained by subtracting the electric power supplied to the external electrical load 105 and/or the power generation system 101 from the sum of the electric power consumed by the external electrical load 105 and the start-up power for the power generation system 101 (i.e., consumed power+start-up power−supplied power) becomes less than or equal to the upper limit power P1.

Next, the control device 110 proceeds to step S205, in which the control device 110 outputs to the controller 103 a start-up permission signal for permitting the start-up of the power generation system 101. In response, the controller 103 starts the start-up of the power generation system 101.

On the other hand, in step S206, the control device 110 rejects the start-up of the power generation system 101, and outputs a start-up rejection signal to the controller 103 or outputs no start-up permission signal, thereby preventing the start-up of the power generation system 101 from being performed. In this case, it is preferred that the control device 110 is configured to notify the user that the start-up of the power generation system 101 cannot be performed. The notification may be performed, for example, by displaying an error message on, or outputting an error warning sound from, the remote controller.

The power supply system 100 (the control device 110 of the power supply system 100) according to Embodiment 2 with the above-described configuration provides the same operational advantages as those of the power supply system 100 (the control device 110 of the power supply system 100) according to Embodiment 1. Moreover, the power supply system 100 (the control device 110 of the power supply system 100) according to Embodiment 2 does not perform the start-up of the power generation system 101 if output power from the electrical storage unit 107 is insufficient to keep the upper limit power P1 not to be exceeded. Accordingly, the occurrence of interruption of the start-up operation of the power generation system 101 is suppressed. That is, the starting performance of the power supply system 100 (the control device 110 of the power supply system 100) according to Embodiment 2 is improved as compared to the starting performance of the power supply system 100 (the control device 110 of the power supply system 100) according to Embodiment 1.

The power supply system 100 (the control device 110 of the power supply system 100) according to Embodiment 2 performs step S206 of rejecting the start-up of the power generation system 101 if the electric power obtained by subtracting the suppliable electric power from the sum of the consumed electric power and the start-up power is greater than the upper limit power P1 (No in step S203). However, the present embodiment is not limited to this. Alternatively, if it is determined No in step S203, the flow may return to step S201 to repeat steps S201 to S203 (i.e., to keep the power generation system 101 standing ready for start-up).

Next, operations that the power supply system 100 according to Embodiment 2 performs at stopping of power generation of the power generation system are described with reference to FIG. 5B.

Figure 5B:
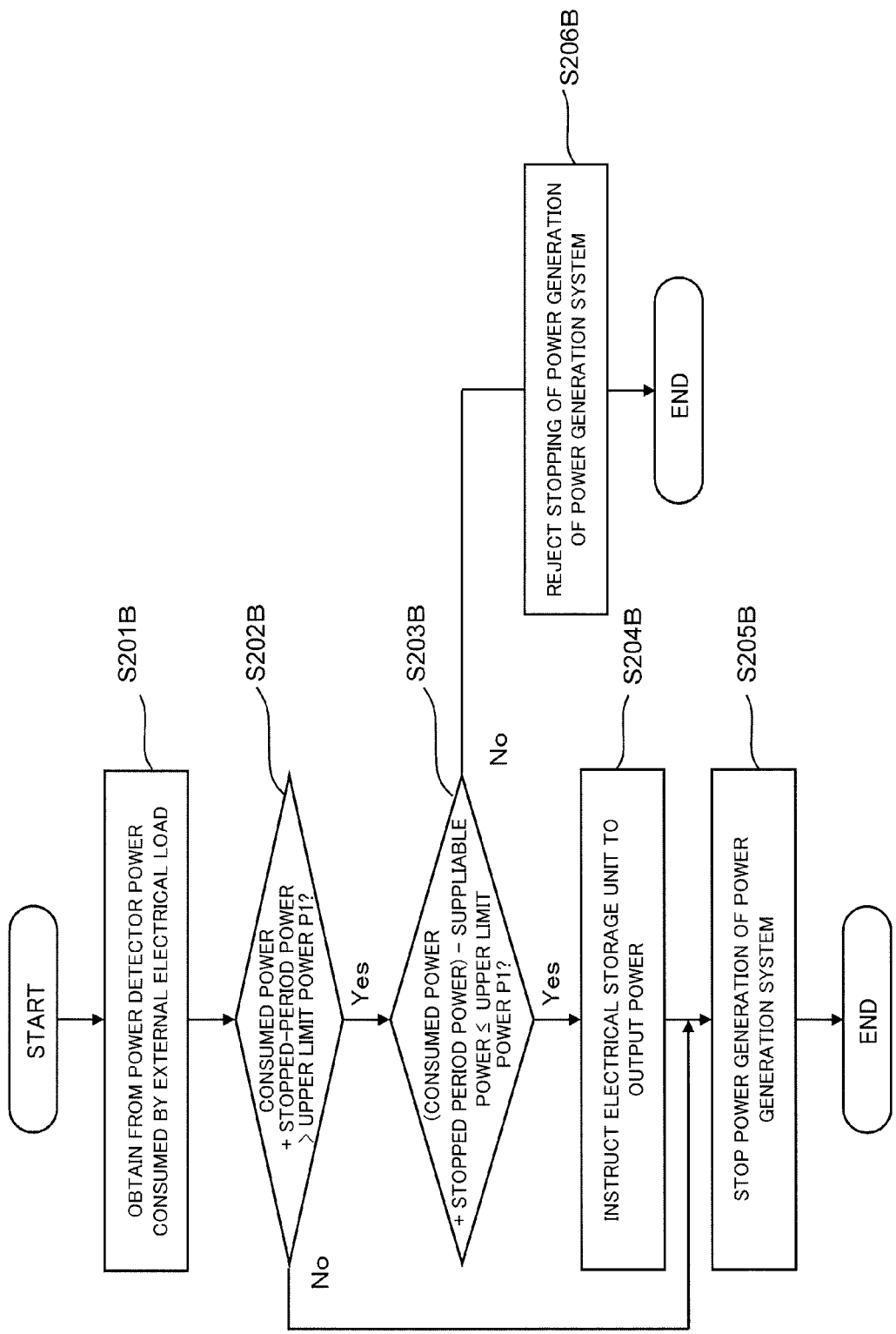
FIG. 5B is an example of a flowchart schematically showing operations that the power supply system according to Embodiment 2 performs at stopping of power generation of the power generation system.

FIG. 5B is an example of a flowchart schematically showing operations that the power supply system according to Embodiment 2 performs at stopping of power generation of the power generation system.

As shown in FIG. 5B, at stopping of power generation of the power generation system 101, the power supply system according to Embodiment 2 performs operations in a manner similar to Embodiment 1. The operation steps performed at stopping of the power generation include the same operations as those performed at the above-described start-up of the power generation system 101. Therefore, hereinafter, a description is given of operation steps, in which operations different from those described in Embodiment 1 and different from those performed at the above-described start-up of the power generation system 101 are performed. Specifically, step S203B and step S206B are described below.

In step S203B, the control device 110 determines whether or not electric power obtained by subtracting electric power suppliable by the electrical storage unit 107 from the sum of electric power consumed by the external electrical load 105 and stopped-period power for the power generation system 101 (i.e., consumed power+stopped-period power−suppliable power) is less than or equal to the upper limit power (here, the upper limit power P1), up to which the electric rate is kept to a relatively low unit price.

In step S206B, the control device 110 rejects the stopping of the power generation of the power generation system 101, and outputs to the controller 103 a signal for rejecting the stopping of the power generation or outputs no signal for permitting the stopping of the power generation, thereby preventing the power generation of the power generation system 101 from being stopped. In this case, it is preferred that the control device 110 is configured to notify the user that the power generation of the power generation system 101 cannot be stopped.

It should be noted that, as an alternative, if the stopping of the power generation of the power generation system 101 is rejected in step S206B, the flow may return to step S201B to repeat the above-described flow (i.e., to keep the power generation system 101 standing ready to stop the power generation) until the power generation of the power generation system 101 is stopped in step S205B.

As described above, the power supply system 100 (the control device 110 of the power supply system 100) according to Embodiment 2 stops the power generation of the power generation system 101 and performs the post-stop operation if output power from the electrical storage unit 107 is sufficient to keep the upper limit power P1 not to be exceeded. Accordingly, the stopping performance is improved as compared to the stopping performance of the power supply system 100 (the control device 110 of the power supply system 100) according to Embodiment 1.

It should be noted that the control device 110 of the power supply system 100 according to Embodiment 2 may be configured to perform at least one of the following control operations: the control operation of controlling the electrical storage unit 107 at start-up of the power generation system 101; and the control operation of controlling the electrical storage unit 107 at stopping of the power generation of the power generation system 101. That is, the control device 110 may be configured to perform either the control operation of controlling the electrical storage unit 107 at start-up of the power generation system 101 or the control operation of controlling the electrical storage unit 107 at stopping of the power generation of the power generation system 101. Alternatively, the control device 110 may be configured to perform both the control operation of controlling the electrical storage unit 107 at start-up of the power generation system 101 and the control operation of controlling the electrical storage unit 107 at stopping of the power generation of the power generation system 101.

(Embodiment 3)

In a power supply system according to Embodiment 3, the control device is configured to perform at least one of first control and second control. The control device performs the first control if, at start-up of the power generation system, it is predicted that a sum of start-up power for the power generation system and electric power consumed by the external electrical load exceeds upper limit power, up to which an electric rate is kept to a relatively low unit price, and that the electric rate is to be changed to a relatively high unit price. The first control is control of supplying electric power stored in the electrical storage unit to at least one of the power generation system and the external electrical load in order to prevent electric power supplied from the power grid from exceeding the upper limit power. The control device performs the second control if, at stopping of power generation of the power generation system, it is predicted that a sum of stopped-period power for the power generation system and electric power consumed by the external electrical load exceeds the upper limit power, up to which the electric rate is kept to a relatively low unit price, and that the electric rate is to be changed to a relatively high unit price. The second control is control of supplying electric power stored in the electrical storage unit to at least one of the power generation system and the external electrical load in order to prevent electric power supplied from the power grid from exceeding the upper limit power.

In the description of Embodiment 3 given below, "at start-up of the power generation system" refers to when the power generation system is performing a start-up operation. Also, in the description of Embodiment 3 given below, "at stopping of the power generation system" refers to when a post-stop operation after stopping the power generation of the power generation system is being performed.

In Embodiment 3, the prediction at start-up of the power generation system as to whether the sum of the start-up power for the power generation system and the electric power consumed by the external electrical load exceeds the upper limit power, up to which the electric rate is kept to a relatively low unit price, and the electric rate is to be changed to a relatively high unit price, is performed as described below.

Specifically, when the start-up operation of the power generation system is being performed, the power detector detects electric power consumed by the power generation system and electric power consumed by the external electrical load. The control device determines whether the sum of the electric power consumed by the power generation system and the electric power consumed by the external electrical load which are detected by the power detector (i.e., the sum of the start-up power for the power generation system and the electric power consumed by the external electrical load) exceeds the upper limit power, up to which the electric rate is kept to a relatively low unit price, and the electric rate is to be changed to a relatively high unit price.

Similarly, in Embodiment 3, the prediction at stopping of the power generation system as to whether the sum of the start-up power for the power generation system and the electric power consumed by the external electrical load exceeds the upper limit power, up to which the electric rate of electric power from the power grid is kept to a relatively low unit price, is performed as described below.

Specifically, when the post-stop operation after stopping the power generation of the power generation system is being performed, the power detector detects electric power consumed by the power generation system and electric power consumed by the external electrical load. The control device determines whether the sum of the electric power consumed by the power generation system and the electric power consumed by the external electrical load which are detected by the power detector (i.e., the sum of the stopped-period power for the power generation system and the electric power consumed by the external electrical load) exceeds the upper limit power, up to which the electric rate of electric power from the power grid is kept to a relatively low unit price.

Here, the aforementioned electric power consumed by the power generation system is specifically electric power consumed by the internal electrical load of the power generation system. Moreover, the prediction by the control device as to whether the sum of the start-up power for the power generation system and the electric power consumed by the external electrical load exceeds the upper limit power, up to which the electric rate is kept to a relatively low unit price, may be performed, for example, based on the amount of increase in the electric power consumed by the internal electrical load and the external electrical load, or based on past usage histories of the internal electrical load and the external electrical load. The prediction may be performed in any manner, so long as it can be predicted whether the upper limit power, up to which the electric rate is kept to a relatively low unit price, is to be exceeded.

Similarly, the prediction by the control device as to whether the sum of the stopped-period power for the power generation system and the electric power consumed by the external electrical load exceeds the upper limit power, up to which the electric rate is kept to a relatively low unit price, may be performed, for example, based on the amount of increase in the electric power consumed by the internal electrical load and the external electrical load, or based on past usage histories of the internal electrical load and the external electrical load. The prediction may be performed in any manner, so long as it can be predicted whether the upper limit power is to be exceeded.

Since the fundamental configuration of the power supply system 100 according to Embodiment 3 is the same as that of the power supply system 100 according to Embodiment 1, the configuration of the power supply system 100 according to Embodiment 3 will not be described below.

Figure 6A:
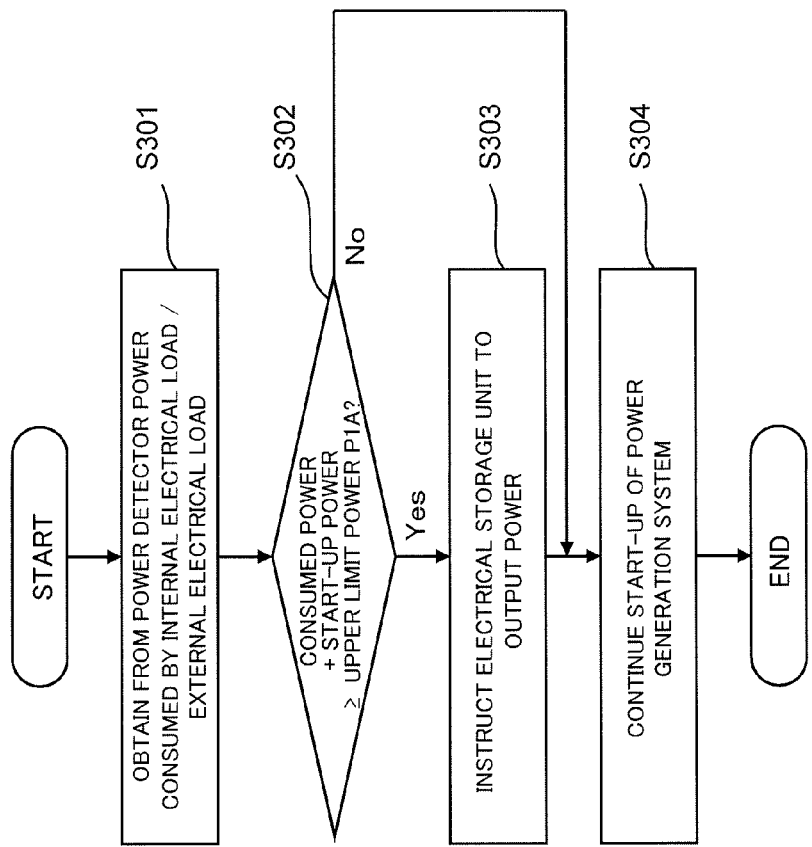
FIG. 6A is a flowchart schematically showing operations that a power supply system according to Embodiment 3 performs at start-up of its power generation system.

FIG. 6A is a flowchart schematically showing operations that the power supply system according to Embodiment 3 performs at start-up of the power generation system.

First, when the power generation system 101 has started the start-up and is performing the start-up operation, the control device 110 obtains, from the power detector 106, electric power used by (consumed by) the power generation system 101 (specifically, the internal electrical load 102) and electric power used by (consumed by) the external electrical load 105, as shown in FIG. 6A (step S301).

Next, the control device 110 determines whether or not the sum of the electric power consumed by the external electrical load 105 and the electric power consumed by the power generation system 101, which are obtained in step S301, is greater than or equal to upper limit power P1A (step S302). If the sum of the consumed electric power and the start-up power is greater than or equal to the upper limit power P1A (Yes in step S302), the flow proceeds to step S303. On the other hand, if the sum is less than the upper limit power NA (No in step S302), the flow proceeds to step S304. Here, the upper limit power P1A is preferably less than the upper limit power up to which the electric rate is kept to a relatively low unit price (here, the upper limit power P1) from the standpoint of not interrupting (i.e., continuing) the start-up operation of the power generation system 101. The upper limit power P1A may be set to any amount of electric power.

In step S303, the control device 110 controls the power controller 108 of the electrical storage unit 107 to cause the electrical storage unit 107 to output electric power. Accordingly, the power controller 108 causes the electrical storage unit 107 to supply electric power to the external electrical load 105 and the power generation system 101 (specifically, the internal electrical load 102 of the power generation system 101). At the time, the power controller 108 controls the electrical storage unit 107 such that electric power used by the power generation system 101 and the external electrical load 105, which is detected by the power detector 106, becomes less than the upper limit power P1A.

Next, the control device 110 proceeds to step S304, in which the control device 110 outputs to the controller 103 a start-up continuation signal for continuing the start-up of the power generation system 101. In response, the controller 103 continues the start-up of the power generation system 101.

As described above, even in cases where electric power consumed by the external electrical load 105 increases after the start of the start-up of the power generation system 101 (including a case where the electric power consumed by the external electrical load 105 is great even before the start of the start-up of the power generation system 101) and the upper limit power P1, up to which the electric rate is kept to a relatively low unit price, is predicted to be exceeded, the power supply system 100 (the control device 110 of the power supply system 100) according to Embodiment 3 can continue the start-up operation of the power generation system 101. Therefore, the power supply system 100 (the control device 110 of the power supply system 100) according to Embodiment 3 allows the electric rate to be kept low while improving the starting performance as compared to conventional power generation systems.

Although in the power supply system 100 according to Embodiment 3 the threshold used in step S302 is set to the upper limit power P1A from the standpoint of more stably continuing the start-up operation of the power generation system 101, the threshold used in step S302 is not limited to the upper limit power P1A, but may be set to the upper limit power P1.

Next, operations that the power supply system 100 according to Embodiment 3 performs at stopping of power generation are described with reference to FIG. 6B.

Figure 6B:
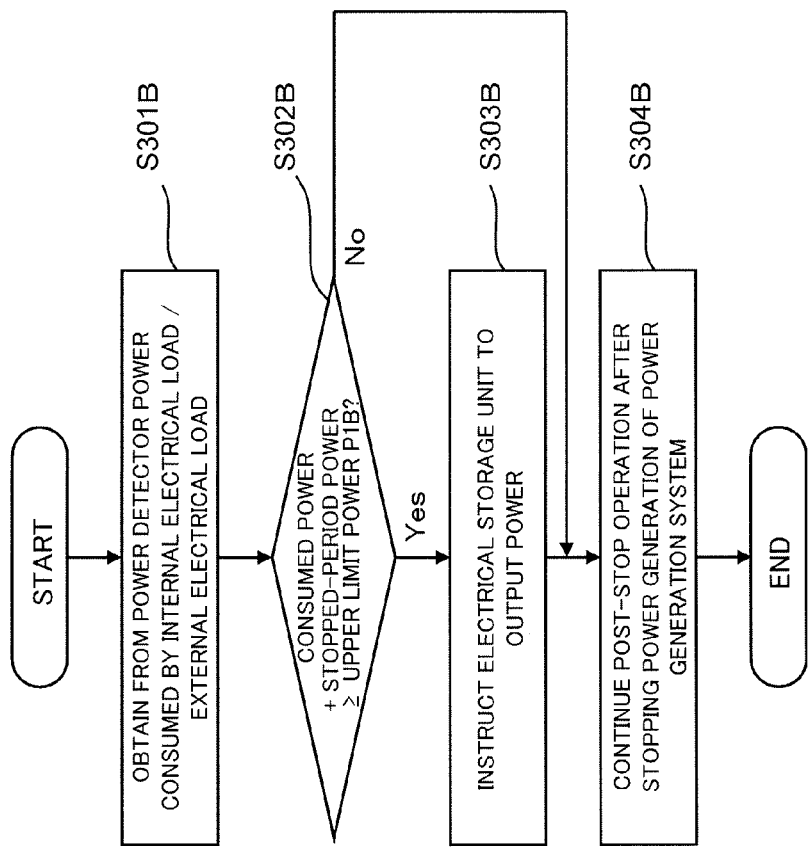
FIG. 6B is an example of a flowchart schematically showing operations that the power supply system according to Embodiment 3 performs at stopping of power generation of the power generation system.

FIG. 6B is an example of a flowchart schematically showing operations that the power supply system according to Embodiment 3 performs at stopping of power generation of the power generation system.

First, when the power generation of the power generation system 101 has stopped and then the post-stop operation after stopping the power generation of the power generation system 101 is being performed, the control device 110 obtains, from the power detector 106, electric power used by (consumed by) the power generation system 101 (specifically, the internal electrical load 102) and electric power used by (consumed by) the external electrical load 105, as shown in FIG. 6B (step S301B).

Next, the control device 110 determines whether the sum of the electric power consumed by the external electrical load 105 and the electric power consumed by the power generation system 101, which are obtained in step S301B, is greater than upper limit power P1B (step S302B). If the sum of the consumed electric power and the start-up power is greater than or equal to the upper limit power P1B (Yes in step S302B), the flow proceeds to step S303B. On the other hand, if the sum is less than the upper limit power P1B (No in step S302B), the flow proceeds to step S304B. Here, the upper limit power P1B is preferably less than the upper limit power up to which the electric rate is kept to a relatively low unit price (here, the upper limit power P1) from the standpoint of not interrupting (i.e., continuing) the post-stop operation after stopping the power generation of the power generation system 101. The upper limit power P1B may be set to any amount of electric power.

In step S303B, the control device 110 controls the power controller 108 of the electrical storage unit 107 to cause the electrical storage unit 107 to output electric power. Accordingly, the power controller 108 causes the electrical storage unit 107 to supply electric power to the external electrical load 105 and the power generation system 101 (specifically, the internal electrical load 102 of the power generation system 101). At the time, the power controller 108 controls the electrical storage unit 107 such that electric power used by the power generation system 101 and the external electrical load 105, which is detected by the power detector 106, becomes less than the upper limit power P1B. It should be noted that in the above control of the electrical storage unit 107, the power controller 108 may control the electrical storage unit 107 to supply electric power to at least the external electrical load 105.

Next, the control device 110 proceeds to step S304B, in which the control device 110 outputs to the controller 103 a signal for continuing the post-stop operation after stopping the power generation of the power generation system 101. In response, the controller 103 continues the post-stop operation after stopping the power generation of the power generation system 101.

As described above, when the power supply system 100 (the control device 110 of the power supply system 100) according to Embodiment 3 is performing the post-stop operation after stopping the power generation of the power generation system 101, even if electric power consumed by the external electrical load 105 increases and the upper limit power P1B is predicted to be exceeded, the power supply system 100 can continue the post-stop operation.

Therefore, the power supply system 100 (the control device 110 of the power supply system 100) according to Embodiment 3 can perform the post-stop operation after stopping the power generation of the power generation system 101 while reducing, as compared to conventional power generation systems, a possibility that the upper limit power, up to which the electric rate is kept to a relatively low unit price, is exceeded.

Although in the power supply system 100 according to Embodiment 3 the threshold used in step S302B is set to the upper limit power P1B from the standpoint of more stably continuing the post-stop operation after stopping the power generation of the power generation system 101, the threshold used in step S302B is not limited to the upper limit power P1B, but may be set to the upper limit power P1.

The control device 110 of the power supply system 100 according to Embodiment 3 may be configured to perform at least one of the following control operations: the control operation of controlling the electrical storage unit 107 at start-up of the power generation system 101; and the control operation of controlling the electrical storage unit 107 at stopping of the power generation of the power generation system 101. That is, the control device 110 may be configured to perform either the control operation of controlling the electrical storage unit 107 at start-up of the power generation system 101 or the control operation of controlling the electrical storage unit 107 at stopping of the power generation of the power generation system 101. Alternatively, the control device 110 may be configured to perform both the control operation of controlling the electrical storage unit 107 at start-up of the power generation system 101 and the control operation of controlling the electrical storage unit 107 at stopping of the power generation of the power generation system 101.

(Embodiment 4)

In a power supply system according to Embodiment 4, the control device is configured to charge the electrical storage unit via the power grid if, prior to a scheduled start-up time of the power generation system, electric power consumed by the external electrical load is less than or equal to the upper limit power, up to which the electric rate is kept to a relatively low unit price.

Alternatively, in the power supply system according to Embodiment 4, the control device may be configured to charge the electrical storage unit via at least one of the power grid and the power generation system if, prior to a scheduled power generation stop time of the power generation system, electric power consumed by the external electrical load is less than or equal to the upper limit power, up to which the electric rate is kept to a relatively low unit price.

Since the fundamental configuration of the power supply system 100 according to Embodiment 4 is the same as that of the power supply system 100 according to Embodiment 1, the configuration of the power supply system 100 according to Embodiment 4 will not be described below.

Figure 7A:
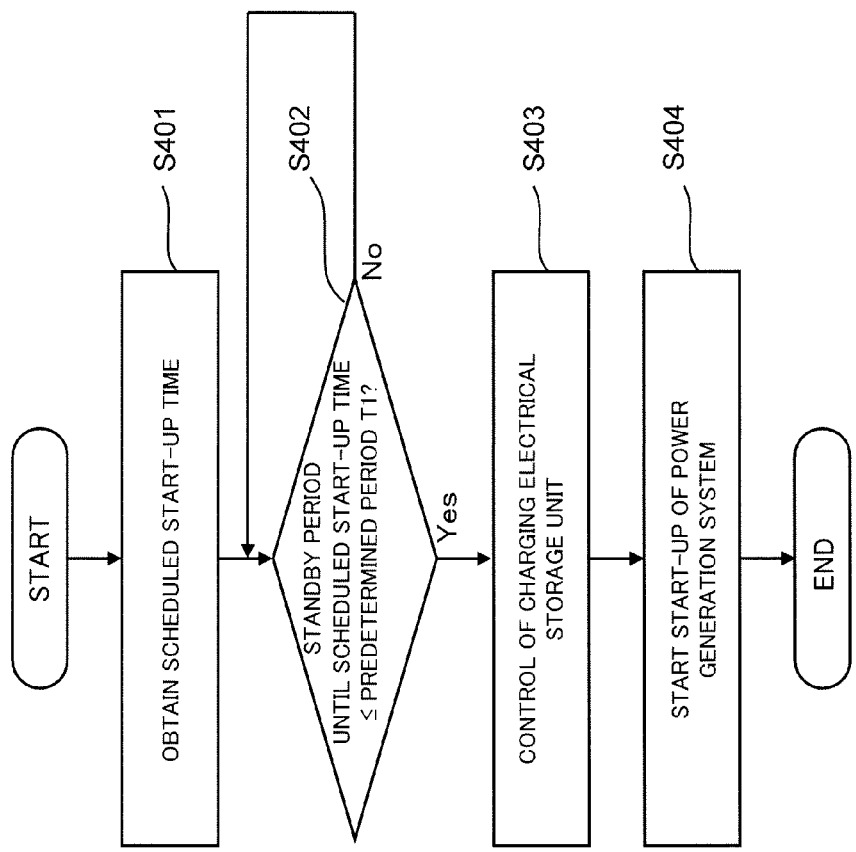
FIG. 7A is a flowchart schematically showing operations that a power supply system according to Embodiment 4 performs at start-up of its power generation system.

FIG. 7A is a flowchart schematically showing operations that the power supply system according to Embodiment 4 performs at start-up of the power generation system.

Here, assume a case where the power generation system 101 has not started and electric power is being supplied from the power grid 104 to the external electrical load 105. In this case, the control device 110 obtains a scheduled start-up time as shown in FIG. 7A (step S401). Specifically, the control device 110 obtains scheduled start-up time information from the controller 103.

Next, the control device 110 calculates a standby period until the scheduled start-up time, based on the scheduled start-up time obtained in step S401 and the current time, and determines whether or not the calculated standby period is shorter than or equal to a predetermined period T1 (step S402). Although the predetermined period T1 herein may be set to any period, it is preferred that the predetermined period T1 is set to such a period as to allow control of charging the electrical storage unit 107 to be performed before determination is made as to whether it is necessary or unnecessary to supply electric power from the electrical storage unit 107, which determination is performed in each of Embodiments 1 to 3 (including the variations).

If the standby period is longer than the predetermined period T1 (No in step S402), the control device 110 returns to step S401 and repeats steps S401 and S402 until the standby period becomes shorter than or equal to the predetermined period T1. On the other hand, if the standby period is shorter than or equal to the predetermined period T1 (Yes in S402), the control device 110 proceeds to step S403.

In step S403, the control device 110 outputs a control signal to instruct the power controller 108 of the electrical storage unit 107 to perform charging of the electrical storage unit 107. In response, the power controller 108 supplies electric power from the power grid 104 to single cells or battery packs forming the storage battery that serves as the electrical storage unit 107, thereby charging the electrical storage unit 107. It should be noted that, as an alternative example, the charging of the electrical storage unit 107 may be performed in the following manner: place a capacitor in the electrical storage unit 107; store electric power from the power grid 104 in the capacitor; and supply the stored electric power to the single cells or the battery packs, thereby charging the electrical storage unit 107. Further, the above-described flow of control indicated by steps S401 to S403 may be applied to any of the power supply systems 100 (any of the control devices 110 of the power supply systems 100) according to Embodiments 1 to 3 (including the variations).

Next, when the scheduled start-up time becomes close, the control device 110 performs determinations as to whether it is necessary or unnecessary to output electric power from the electrical storage unit 107 and whether to permit or reject starting of the start-up of the power generation system 101, each of which determinations is performed in any of Embodiments 1 to 3 (including the variations). If the start-up is permitted, the start-up of the power generation system 101 is started (step S404).

The power supply system 100 (the control device 110 of the power supply system 100) according to Embodiment 4 with the above-described configuration charges the electrical storage unit 107 before starting the start-up of the power generation system 101 while reducing a possibility that the upper limit power, up to which the electric rate is kept to a relatively low unit price, is exceeded. This allows the capability of supplying electric power from the electrical storage unit 107 to be improved, which makes it possible to further improve the starting performance of the power generation system 101.

Next, operations that the power supply system 100 according to Embodiment 4 performs at stopping of power generation are described with reference to FIG. 7B.

Figure 7B:
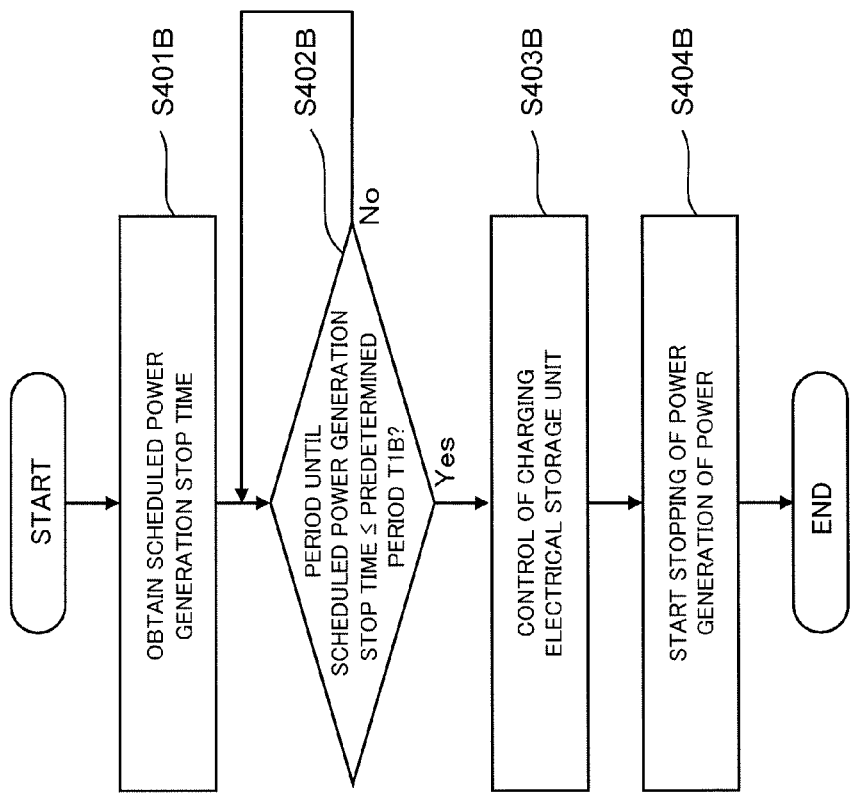
FIG. 7B is an example of a flowchart schematically showing operations that the power supply system according to Embodiment 4 performs at stopping of power generation of the power generation system.

FIG. 7B is an example of a flowchart schematically showing operations that the power supply system according to Embodiment 4 performs at stopping of power generation of the power generation system.

Here, assume a case where the power generation system 101 is performing a power generation operation. In this case, the control device 110 obtains a scheduled power generation stop time of the power generation system 101 as shown in FIG. 7B (step S401B). Specifically, the control device 110 obtains scheduled power generation stop time information from the controller 103.

Next, the control device 110 calculates a period until the scheduled power generation stop time, based on the scheduled power generation stop time obtained in step S401B and the current time, and determines whether or not the period thus calculated (hereinafter, referred to as a calculated period) is shorter than or equal to a predetermined period T1B (step S402B). Although the predetermined period T1B herein may be set to any period, it is preferred that the predetermined period T1B is set to such a period as to allow control of charging the electrical storage unit 107 to be performed before determination is made as to whether it is necessary or unnecessary to supply electric power from the electrical storage unit 107, which determination is performed in each of Embodiments 1 to 3 (including the variations).

If the calculated period is longer than the predetermined period T1B (No in step S402B), the control device 110 returns to step S401B and repeats steps S401B and S402B until the calculated period becomes shorter than or equal to the predetermined period T1B. On the other hand, if the calculated period is shorter than or equal to the predetermined period T1B (Yes in S402B), the control device 110 proceeds to step S403B.

In step S403B, the control device 110 outputs a control signal to instruct the power controller 108 of the electrical storage unit 107 to perform charging of the electrical storage unit 107. In response, the power controller 108 supplies electric power from at least one of the power grid 104 and the power generation system 101 to single cells or battery packs forming the storage battery that serves as the electrical storage unit 107, thereby charging the electrical storage unit 107. It should be noted that the above-described flow of control indicated by steps S401B to S403B may be applied to any of the power supply systems 100 (any of the control devices 110 of the power supply systems 100) according to Embodiments 1 to 3 (including the variations).

Next, when the scheduled power generation stop time of the power generation system 101 becomes close, the control device 110 performs determinations as to whether it is necessary or unnecessary to output electric power from the electrical storage unit 107 and whether to permit or reject starting of the stopping of the power generation of the power generation system 101, each of which determinations is performed in any of Embodiments 1 to 3 (including the variations). If the stopping of the power generation is permitted, the stopping of the power generation of the power generation system 101 is started (step S404B).

As described above, the power supply system 100 (the control device 110 of the power supply system 100) according to Embodiment 4 charges the electrical storage unit 107 before starting the stopping of the power generation of the power generation system 101. This allows the capability of supplying electric power from the electrical storage unit 107 to be improved, which makes it possible to improve the stopping performance as compared to conventional power generation systems.

It should be noted that the control device 110 of the power supply system 100 according to Embodiment 4 may be configured to perform at least one of the following control operations: the control operation of controlling the electrical storage unit 107 at start-up of the power generation system 101; and the control operation of controlling the electrical storage unit 107 at stopping of the power generation of the power generation system 101. That is, the control device 110 may be configured to perform either the control operation of controlling the electrical storage unit 107 at start-up of the power generation system 101 or the control operation of controlling the electrical storage unit 107 at stopping of the power generation of the power generation system 101. Alternatively, the control device 110 may be configured to perform both the control operation of controlling the electrical storage unit 107 at start-up of the power generation system 101 and the control operation of controlling the electrical storage unit 107 at stopping of the power generation of the power generation system 101.

(Embodiment 5)

Each of the above-described power supply systems 100 according to Embodiments 1 to 4 (including the variations) is configured to supply electric power to both the internal electrical load and the external electrical load when the electrical storage unit 107 outputs the electric power at start-up of the power generation system 101.

On the other hand, a power supply system according to Embodiment 5 serves as an example in which the output power from the electrical storage unit is supplied to, at least, one of the external electrical load and the internal electrical load.

[Configuration of Power Supply System]

Figure 8:
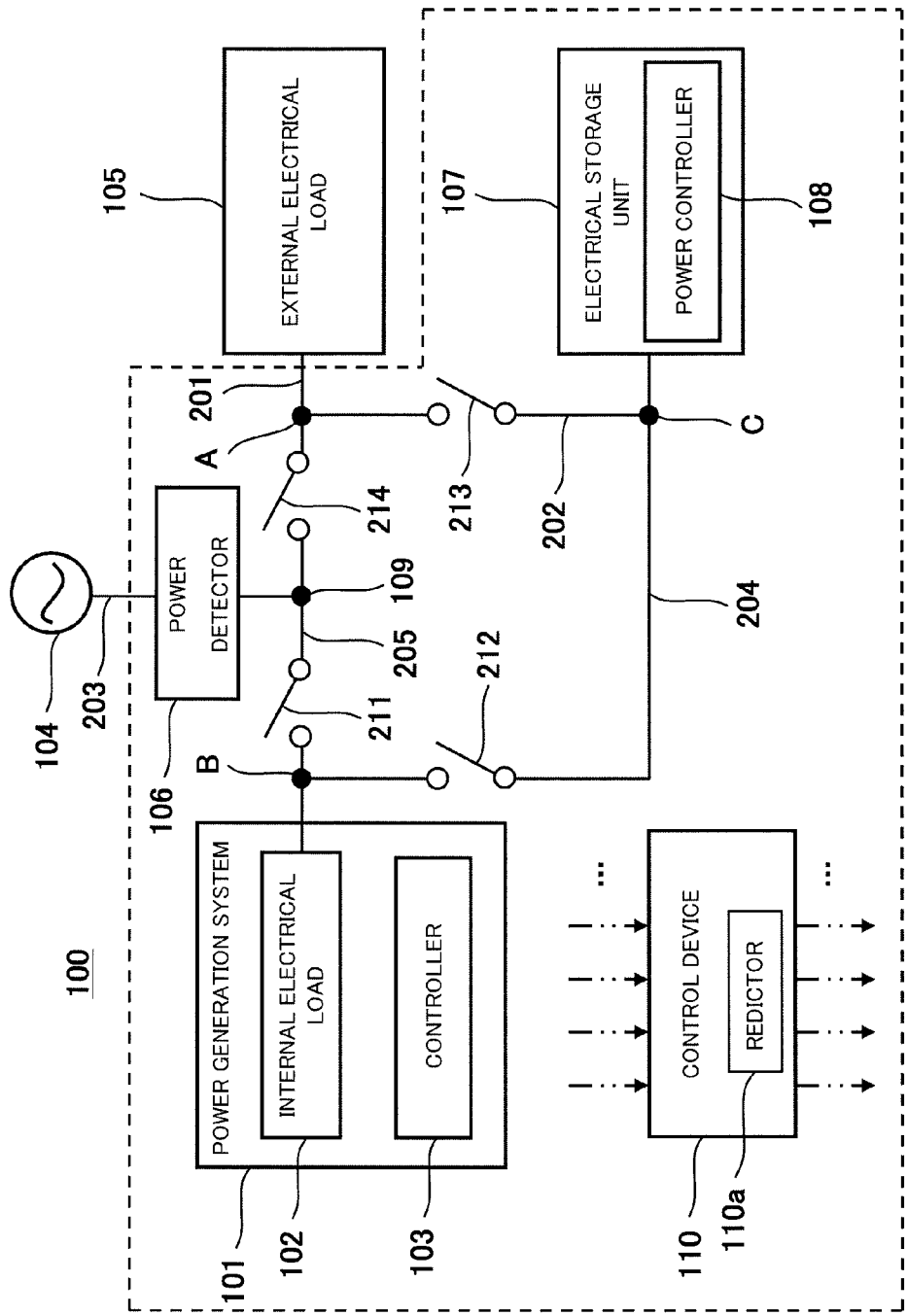
FIG. 8 is a block diagram schematically showing a configuration of a power supply system according to Embodiment 5 and a configuration of a control device of the power supply system.

FIG. 8 is a block diagram schematically showing a configuration of the power supply system according to Embodiment 5 and a configuration of a control device of the power supply system.

As shown in FIG. 8, the fundamental configuration of the power supply system 100 according to Embodiment 8 is the same as that of the power supply system 100 according to Embodiment 1. However, the power supply system 100 according to Embodiment 5 is different from the power supply system 100 according to Embodiment 1 in that the power supply system 100 according to Embodiment 5 is configured such that output power from the electrical storage unit 107 is supplied to, at least, one of the external electrical load 105 and the internal electrical load 102 of the power generation system 101.

Specifically, the power supply system 100 according to Embodiment 5 includes wiring 202 which electrically connects, at a connection point A, the electrical storage unit 107 and an electrical path (wiring 201) extending between the interconnection point 109 and the external electrical load 105. The power supply system 100 according to Embodiment 5 also includes wiring 204 which electrically connects, at a connection point B, the electrical storage unit 107 and an electrical path (wiring 205) extending between the interconnection point 109 and the internal electrical load 102.

A relay 213 is provided along the wiring 202, and a relay 212 is provided along the wiring 204. A relay 214 is provided on the electrical path (wiring 201) between the interconnection point 109 and the connection point A. A relay 211 is provided on the electrical path (wiring 205) between the interconnection point 109 and the connection point B.

Accordingly, the control device 110 can control, through control of the relays 211 to 214, electric power supply from the electrical storage unit 107 to at least one of the internal electrical load 102 and the external electrical load 105. Also, the control device 110 can control, through control of the relays 211 to 214, electric power supply from the power grid 104 to at least one of the internal electrical load 102 and the external electrical load 105. Specifically, the control device 110 controls the relays 211 to 214 in the manner described below.

(A) Case of supplying electric power from the power grid 104 to the external electrical load 105, and supplying electric power from the electrical storage unit 107 to the internal electrical load 102.

The control device 110 controls the relays 211 to 214 to close the relays 212 and 214 and to open the relays 211 and 213. As a result, electric power is supplied from the power grid 104 to the external electrical load 105 through the wiring 203 and the wiring 201, and electric power is supplied from the electrical storage unit 107 to the internal electrical load 102 through the wiring 204 and the wiring 201.

(B) Case of supplying electric power from the power grid 104 to the internal electrical load 102, and supplying electric power from the electrical storage unit 107 to the external electrical load 105.

The control device 110 controls the relays 211 to 214 to close the relays 211 and 213 and to open the relays 212 and 214. As a result, electric power is supplied from the power grid 104 to the internal electrical load 102 through the wiring 203 and the wiring 201, and electric power is supplied from the electrical storage unit 107 to the external electrical load 105 through the wiring 202 and the wiring 201.

(C) Case of supplying electric power from each of the power grid 104 and the electrical storage unit 107 to both of the internal electrical load 102 and the external electrical load 105.

The control device 110 controls the relays 211 to 214 to close the relays 211, 212, and 214 and to open the relay 213. As a result, electric power can be supplied from the power grid 104 to both of the internal electrical load 102 and the external electrical load 105 through the wiring 203 and the wiring 201, and also, electric power can be supplied from the electrical storage unit 107 to both of the internal electrical load 102 and the external electrical load 105 through the wiring 204 and the wiring 201. It should be noted that, alternatively, the control device 110 may control the relays 211 to 214 to close the relays 211, 213, and 214 and to open the relay 212, or to close all of the relays 211 to 214.

The power supply system 100 (the control device 110 of the power supply system 100) according to Embodiment 5 with the above-described configuration provides the same operational advantages as those of the power supply systems 100 according to Embodiments 1 to 4 (including the variations), by performing the start-up operations of the respective power supply systems 100 according to Embodiments 1 to 4 (including the variations).

Although in Embodiment 5 the electric power supply from the electrical storage unit 107 is controlled by using the relays 211 to 214, the manner of controlling the electric power supply from the electrical storage unit 107 is not limited to this. The electric power supply from the electrical storage unit 107 may be controlled in any manner, so long as electric power is supplied from the electrical storage unit 107 to at least one of the external electrical load 105 and the internal electrical load 102.

In each of the above-described power supply systems 100 according to Embodiments 1 to 5 (including the variations), the power detector 106 is provided between the power grid 104 and the interconnection point 109. However, as an alternative, the power detector 106 may be provided between the interconnection point 109 and the external electrical load 105. In this case, the power detector 106 detects electric power consumed by the external electrical load 105. Accordingly, the sum of electric power consumed by the power generation system 101 (the internal electrical load 102) and the electric power consumed by the external electrical load 105 is the sum of a detection value of the power detector 106 and a detection value of a power detector (not shown) that detects the electric power consumed by the internal electrical load 102.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structures and/or functional details may be substantially altered without departing from the spirit of the present invention. In addition, various inventions can be made by suitable combinations of a plurality of components disclosed in the above embodiments.

INDUSTRIAL APPLICABILITY

In the case of introducing an electric rate system that varies an electric rate in accordance with electric power usage by a consumer, the power supply system, the control device of the power supply system, the operation method of the power supply system, and the control method of the power supply system, according to the present invention, are useful since they improve at least one of the starting performance and the stopping performance of the power generation system while suppressing an increase in the electric rate for the consumer's home.

REFERENCE SIGNS LIST

1 reformer
2 CO reducer
3 electric heater
10 power generation system
11 hydrogen generation apparatus
12 oxidizing gas supply device
13 fuel cell
13A fuel gas channel
13B oxidizing gas channel
13C cooling medium channel
14 cooling medium tank
15 electric heater
31 fuel gas supply passage
32 oxidizing gas supply passage
33 cooling medium passage
100 power supply system
101 power generation system (fuel cell system)
102 internal electrical load
103 controller
104 power grid
105 external electrical load
106 power detector
107 electrical storage unit
108 power controller
109 interconnection point
110 control device
110a predictor
201 wiring
202 wiring
203 wiring
204 wiring
205 wiring
211 relay
212 relay
213 relay
214 relay

The invention claimed is:

1. A power supply system comprising:
    a power generation system;
    an electrical storage unit configured to supply electric power to the power generation system and an external electrical load; and
    a control device configured to perform at least one of first control and second control,
    the control device performing the first control if, at start-up of the power generation system, it is predicted that a sum of start-up power for the power generation system and electric power consumed by the external electrical load exceeds upper limit power, up to which an electric rate is kept to a relatively low unit price, and that the electric rate is to be changed to a relatively high unit price, the first control being control of supplying electric power stored in the electrical storage unit to at least one of the power generation system and the external electrical load in order to prevent electric power supplied from a power grid from exceeding the upper limit power,
    the control device performing the second control if, at stopping of power generation of the power generation system, it is predicted that a sum of stopped-period power for the power generation system and electric power consumed by the external electrical load exceeds the upper limit power, up to which the electric rate is kept to a relatively low unit price, and that the electric rate is to be changed to a relatively high unit price, the second control being control of supplying electric power stored in the electrical storage unit to at least one of the power generation system and the external electrical load in order to prevent electric power supplied from the power grid from exceeding the upper limit power.

2. The power supply system according to claim 1, wherein the control device is configured to determine whether to permit or reject the start-up of the power generation system, based on suppliable electric power from the electrical storage unit.

3. The power supply system according to claim 1, wherein the control device is configured to determine whether to permit or reject continuation of a start-up process of the power generation system, based on suppliable electric power from the electrical storage unit.

4. The power supply system according to claim 1, wherein the control device is configured to charge the electrical storage unit via the power grid if, prior to a scheduled start-up time of the power generation system, electric power consumed by the external electrical load is less than or equal to the upper limit power.

5. The power supply system according to claim 1, wherein the power generation system is a fuel cell system, and the fuel cell system includes an electric heater configured to increase a temperature of a component device of the fuel cell system to such a temperature as to allow a power generation operation to be performed at the start-up.

6. The power supply system according to claim 1, wherein the control device is configured to determine whether to permit or reject the stopping of the power generation of the power generation system, based on suppliable electric power from the electrical storage unit.

7. The power supply system according to claim 1, wherein the control device is configured to determine whether to permit or reject continuation of a post-stop operation after stopping the power generation of the power generation system, based on suppliable electric power from the electrical storage unit.

8. The power supply system according to claim 1, wherein the control device is configured to charge the electrical storage unit via at least one of the power grid and the power generation system if, prior to a scheduled power generation stop time of the power generation system, electric power consumed by the external electrical load is less than or equal to the upper limit power.

9. The power supply system according to claim 1, wherein the power generation system is a fuel cell system, and the fuel cell system includes an electric heater configured to heat a water tank which stores water recovered from an exhaust gas generated in the fuel cell system.

10. The power supply system according to claim 1, wherein the control device includes:
    a determiner configured to determine cost advantage information which is obtained when the control device performs at least one of the first control and the second control; and
    an external output device configured to output, to outside, the cost advantage information determined by the determiner.

11. The power supply system according to claim 10, further comprising a display device configured to display the cost advantage information outputted from the external output device.

12. A control device of a power supply system, configured to control the power supply system which includes: a power generation system; an external electrical load; and an electrical storage unit configured to supply electric power to the power generation system and the external electrical load, wherein
    the control device of the power supply system is configured to perform at least one of first control and second control,
    the control device performs the first control if, at start-up of the power generation system, it is predicted that a sum of start-up power for the power generation system and electric power consumed by the external electrical load exceeds upper limit power, up to which an electric rate is kept to a relatively low unit price, and that the electric rate is to be changed to a relatively high unit price, the first control being control of supplying electric power stored in the electrical storage unit to at least one of the power generation system and the external electrical load in order to prevent electric power supplied from a power grid from exceeding the upper limit power, and
    the control device performs the second control if, at stopping of power generation of the power generation system, it is predicted that a sum of stopped-period power for the power generation system and electric power consumed by the external electrical load exceeds the upper limit power, up to which the electric rate is kept to a relatively low unit price, and that the electric rate is to be changed to a relatively high unit price, the second control being control of supplying electric power stored in the electrical storage unit to at least one of the power generation system and the external electrical load in order to prevent electric power supplied from the power grid from exceeding the upper limit power.

13. The control device of the power supply system, according to claim 12, wherein the control device of the power supply system is configured to determine whether to permit or reject the start-up of the power generation system, based on suppliable electric power from the electrical storage unit.

14. The control device of the power supply system, according to claim 12, wherein the control device of the power supply system is configured to determine whether to permit or reject continuation of a start-up process of the power generation system, based on suppliable electric power from the electrical storage unit.

15. The control device of the power supply system, according to claim 12, wherein the control device of the power supply system is configured to charge the electrical storage unit via the power grid if, prior to a scheduled start-up time of the power generation system, electric power consumed by the external electrical load is less than or equal to the upper limit power.

16. The control device of the power supply system, according to claim 12, wherein the control device of the power supply system is configured to determine whether to permit or reject the stopping of the power generation of the power generation system, based on suppliable electric power from the electrical storage unit.

17. The control device of the power supply system, according to claim 12, wherein
the control device of the power supply system is configured to determine whether to permit or reject continuation of a post-stop operation after stopping the power generation of the power generation system, based on suppliable electric power from the electrical storage unit.

18. The control device of the power supply system, according to claim 12, wherein
the control device of the power supply system is configured to charge the electrical storage unit via at least one of the power grid and the power generation system if, prior to a scheduled power generation stop time of the power generation system, electric power consumed by the external electrical load is less than or equal to the upper limit power.

19. The control device of the power supply system, according to claim 12, comprising:
a determiner configured to determine cost advantage information which is obtained when the control device performs at least one of the first control and the second control; and
an external output device configured to output, to outside, the cost advantage information determined by the determiner.

20. The control device of the power supply system, according to claim 19, further comprising a display device configured to display the cost advantage information outputted from the external output device.

21. An operation method of a power supply system, comprising performing at least one of first control and second control,
the first control including:
at start-up of a power generation system, predicting whether a sum of start-up power for the power generation system and electric power consumed by an external electrical load exceeds upper limit power, up to which an electric rate is kept to a relatively low unit price, and the electric rate is to be changed to a relatively high unit price; and
if the electric rate is predicted to be changed to the relatively high unit price, supplying electric power stored in an electrical storage unit to at least one of the power generation system and the external electrical load in order to prevent electric power supplied from a power grid from exceeding the upper limit power,
the second control including:
at stopping of power generation of the power generation system, predicting whether a sum of stopped-period power for the power generation system and electric power consumed by the external electrical load exceeds the upper limit power, up to which the electric rate is kept to a relatively low unit price, and the electric rate is to be changed to a relatively high unit price; and
if the electric rate is predicted to be changed to the relatively high unit price, supplying electric power stored in the electrical storage unit to at least one of the power generation system and the external electrical load in order to prevent electric power supplied from the power grid from exceeding the upper limit power.

22. A control method of a power supply system, comprising performing at least one of first control and second control,
the first control including:
at start-up of a power generation system, predicting whether a sum of start-up power for the power generation system and electric power consumed by an external electrical load exceeds upper limit power, up to which an electric rate is kept to a relatively low unit price, and the electric rate is to be changed to a relatively high unit price; and
if the electric rate is predicted to be changed to the relatively high unit price, supplying electric power stored in an electrical storage unit to at least one of the power generation system and the external electrical load in order to prevent electric power supplied from a power grid from exceeding the upper limit power,
the second control including:
at stopping of power generation of the power generation system, predicting whether a sum of stopped-period power for the power generation system and electric power consumed by the external electrical load exceeds the upper limit power, up to which the electric rate is kept to a relatively low unit price, and the electric rate is to be changed to a relatively high unit price; and
if the electric rate is predicted to be changed to the relatively high unit price, supplying electric power stored in the electrical storage unit to at least one of the power generation system and the external electrical load in order to prevent electric power supplied from the power grid from exceeding the upper limit power.

* * * * *